United States Patent
Alini et al.

(10) Patent No.: US 9,170,715 B1
(45) Date of Patent: Oct. 27, 2015

(54) SYSTEM AND METHOD FOR MASS VISUALIZATION OF REAL ESTATE PROPERTIES

(71) Applicant: CounterPointe Digital Technologies, LLC, Orlando, FL (US)

(72) Inventors: Eric J. Alini, Harrison, NY (US); Taimur Jamil, West New York, NJ (US); Steven Heller, Woodbury, NY (US); Mohamad Ellawand, Dunnellon, FL (US)

(73) Assignee: CounterPointe Digital Technologies LLC, Orlando, FL (US)

( * ) Notice: Subject to any disclaimer, the term of this patent is extended or adjusted under 35 U.S.C. 154(b) by 288 days.

(21) Appl. No.: 13/757,568

(22) Filed: Feb. 1, 2013

Related U.S. Application Data

(60) Provisional application No. 61/594,601, filed on Feb. 3, 2012.

(51) Int. Cl.
  *G06F 3/0484* (2013.01)
  *G06Q 50/16* (2012.01)
  *G06Q 30/02* (2012.01)
  *G06Q 30/06* (2012.01)
  *G06F 17/30* (2006.01)

(52) U.S. Cl.
  CPC ........ *G06F 3/0484* (2013.01); *G06F 17/30861* (2013.01); *G06Q 30/02* (2013.01); *G06Q 30/06* (2013.01); *G06Q 50/16* (2013.01)

(58) Field of Classification Search
  CPC ....... G06Q 30/02; G06Q 30/06; G06Q 50/16; G06F 17/30861; G06F 3/0484
  USPC ................... 715/764, 771; 705/313
  See application file for complete search history.

(56) References Cited

U.S. PATENT DOCUMENTS

| | | | | |
|---|---|---|---|---|
| 6,636,803 | B1 * | 10/2003 | Hartz et al. | 701/459 |
| 2006/0197781 | A1 * | 9/2006 | Arutunian | 345/629 |
| 2011/0196762 | A1 * | 8/2011 | DuPont | 705/27.1 |
| 2012/0030151 | A1 * | 2/2012 | Huang et al. | 706/12 |
| 2012/0265633 | A1 * | 10/2012 | Wohlstadter et al. | 705/26.3 |
| 2012/0311431 | A1 * | 12/2012 | Breaker et al. | 715/234 |
| 2013/0041841 | A1 * | 2/2013 | Lyons | 705/36 R |

* cited by examiner

*Primary Examiner* — Ting Lee
(74) *Attorney, Agent, or Firm* — Loeb & Loeb, LLP

(57) ABSTRACT

The invention relates to a method of assessing real estate properties comprising: (a) obtaining geocodes for the real estate properties based on the addresses or assessor parcel numbers; (b) obtaining at least two images of the real estate properties from an aerial vendor; (c) inputting the list of real estate properties, the addresses or assessor parcel numbers of the real estate properties, the geocodes for the real estate properties, and detailed images of the real estate properties into a database; (d) providing a computer having access to the database via a graphical user interface; (e) displaying the images of the real estate properties; and (f) rating the real estate properties. The described method of assessing real estate properties may further include steps of receiving a list of real estate properties; and obtaining the addresses or assessor parcel numbers for the real estate properties included in the list.

17 Claims, 29 Drawing Sheets

Create Project

*Fields with * are required.*

Client *

[ ABC ▼ ]

Name *

[                    ]

Description

[                    ]

Analyst Group*

[ Everybody ▼ ]

Due Date

[ 01/26/2012 ]

Priority*

[ Normal ▼ ]

Status

[ Pending ▼ ]

Required Reviews

[ 1 ]

Manager Comments

[                    ]

[ Create ]

Fig. 4

PROJECT: ABC WHOLE LOAN POOL

| | | | |
|---|---|---|---|
| ID | 9 | Priority | Normal |
| Name | ABC whole loan pool | Due Date | 12/17/2011 |
| Description | test 1 | Status | Active |
| Client | Demo Client | Required Reviews | 2 |
| Analyst Group | Everybody | Manager Comments | |
| Date Created | 12/17/2011 06:48 | Completed | 8/20 |
| Created By | admin | Problems | 4 |

OPERATIONS
- Create Project
- Update Project
- Upload 5 Test Properties (temp)
- Manage Questions
- Summary Dashboard
- Advanced Reporting

[ Refresh List ]     Progress     Displaying 1-20 of 20 result(s).

| Street | City | State | Zip | Rating | SBM | Last Accessed | Status | Conflict | High Variance | Low Rating | CO |
|---|---|---|---|---|---|---|---|---|---|---|---|
| 512 PALMETTO AVE | LEHIGH ACRES | Florida | 33972 | | 2 | 01/16/2012 09:14 | Problem | Yes | | Yes | View... |
| 720 CONNECTICUT LN | LEHIGH ACRES | Florida | 33936 | | 2 | 01/26/2012 13:17 | Problem | Yes | | | View... |
| 515 COLUMBUS AVE | LEHIGH ACRES | Florida | 33972 | | 2 | 12/17/2011 07:16 | Problem | Yes | | | View... |
| 508 LAKE AVE | LEHIGH ACRES | Florida | 33972 | | 2 | 01/18/2012 08:14 | Problem | | | Yes | View... |
| 735 ARTHUR AVE | LEHIGH ACRES | Florida | 33936 | | 0 | 01/26/2012 13:17 | Active | | | | View... |
| 621 JEFFERSON AVE | LEHIGH ACRES | Florida | 33936 | | 1 | 01/26/2012 09:03 | Active | | | | View... |
| 505 PALMETTO AVE | LEHIGH ACRES | Florida | 33972 | | 1 | 01/26/2012 09:03 | Problem | | Yes | | View... |
| 417 CANTON AVE | LEHIGH ACRES | Florida | 33972 | | 0 | 01/26/2012 22:29 | Active | | | | View... |
| 8070 FOUNTAIN MIST BLVD | LEHIGH ACRES | Florida | 33972 | | 0 | 01/24/2012 22:28 | Active | | | | View... |
| 513 HIBISCUS AVE | LEHIGH ACRES | Florida | 33972 | | 1 | 01/18/2012 11:25 | Active | | | | View... |
| 403 WILLARD AVE | LEHIGH ACRES | Florida | 33972 | | 1 | 01/18/2012 18:26 | Active | | | | View... |
| 418 HIBISCUS AVE | LEHIGH ACRES | Florida | 33972 | 7.00 | 3 | 01/16/2012 09:15 | Overridden | | | | View... |
| 1446 CAYWOOD CIR N | LEHIGH ACRES | Florida | 33936 | | 0 | 01/12/2012 16:45 | Active | | | | View... |
| 707 GREENWOOD AVE | LEHIGH ACRES | Florida | 33972 | | 0 | 01/12/2012 16:45 | Active | | | | View... |
| 713 LINCOLN AVE | LEHIGH ACRES | Florida | 33972 | | 1 | 01/12/2012 13:05 | Active | | | | View... |
| 707 EIGHTH AVE | LEHIGH ACRES | Florida | 33972 | 5.00 | 3 | 12/19/2011 18:18 | Overridden | | | | View... |

Fig. 5

Create Question

*Fields with * are required.*

Operations
- List Questions

Property Types:* 
- ☐ Residential - Single Family
- ☐ Residential - Manufactured Housing
- ☐ Residential - RV Park
- ☐ Commercial - Retail
- ☐ Commercial - Hotel
- ☐ Commercial - Mini Storage
- ☐ Commercial - Vacant Land
- ☐ Commercial - Golf Course
- ☐ Commercial - Parking
- ☐ Residential - Multi Family
- ☐ Residential - Mobile Home Park
- ☐ Commercial - Apartments
- ☐ Commercial - Office
- ☐ Commercial - Warehouse
- ☐ Commercial - Industrial
- ☐ Commercial - Religious
- ☐ Commercial - Speciality
- ☐ Commercial - Restaurants Question Text:* [                    ]

Required: ☑

Question Type:* [Custom Options ▼]
- Text
- Rating: 1 to 10
- Yes/No
- Excellent/Good/Poor
- Custom Options

Direction: [Horiz...]
○ <1>  ○ <2>  ○ <3>

Enter radio options here:
```
<1>
<2>
<3>
```

[Create]

Fig. 6

Create Question

*Fields with * are required.*

| Operations |
|---|
| ○ List Questions |

Property Types:*
- ☐ Residential - Single Family
- ☐ Residential - Manufactured Housing
- ☐ Residential - RV Park
- ☐ Commercial - Retail
- ☐ Commercial - Hotel
- ☐ Commercial - Mini Storage
- ☐ Commercial - Vacant Land
- ☑ Commercial - Golf Course
- ☐ Commercial - Parking

- ☐ Residential - Multi Family
- ☐ Residential - Mobile Home Park
- ☐ Commercial - Apartments
- ☐ Commercial - Office
- ☐ Commercial - Warehouse
- ☐ Commercial - Industrial
- ☐ Commercial - Religious
- ☐ Commercial - Speciality
- ☐ Commercial - Restaurants

| Question Text:* | Is the course well-maintained? |
|---|---|
| Required: | ☑ |
| Question Type:* | Text ⇕ |

[ Create ]

Fig. 7

Create Question

*Fields with * are required.*

| Operations |
|---|
| ○ List Questions |

Property Types:*
- ☑ Residential - Single Family
- ☐ Residential - Manufactured Housing
- ☐ Residential - RV Park
- ☐ Commercial - Retail
- ☐ Commercial - Hotel
- ☐ Commercial - Mini Storage
- ☐ Commercial - Vacant Land
- ☐ Commercial - Golf Course
- ☐ Commercial - Parking
- ☐ Residential - Multi Family
- ☐ Residential - Mobile Home Park
- ☐ Commercial - Apartments
- ☐ Commercial - Office
- ☐ Commercial - Warehouse
- ☐ Commercial - Industrial
- ☐ Commercial - Religious
- ☐ Commercial - Speciality
- ☐ Commercial - Restaurants Question Text:* | Rate the overall condition of the house.

Required: ☑

Question Type:* | Rating: 1 to 10 ⬍

Direction: | Horizontal ⬍

○ 10 ○ 9 ○ 8 ○ 7 ○ 6 ○ 5 ○ 4 ○ 3 ○ 2 ○ 1

Min. Avg. Rating: | 4.0

Max. Variance: | 2.35

Max. Additional Reviews: | 2 ⬍
*In case Max Variance is not met.*

[ Create ]

Fig. 8

Create Question

*Fields with * are required.*

Operations
○ List Questions

Property Types:*
☐ Residential - Single Family ☐ Residential - Multi Family
☐ Residential - Manufactured Housing ☑ Residential - Mobile Home Park
☐ Residential - RV Park ☐ Commercial - Apartments
☐ Commercial - Retail ☐ Commercial - Office
☐ Commercial - Hotel ☐ Commercial - Warehouse
☐ Commercial - Mini Storage ☐ Commercial - Industrial
☐ Commercial - Vacant Land ☐ Commercial - Religious
☐ Commercial - Golf Course ☐ Commercial - Speciality
☐ Commercial - Parking ☐ Commercial - Restaurants

| Question Text:* | What type of property? |

Required: ☑

| Question Type:* | Custom Options ⬍ |

Direction: | Horizontal ⬍ |

Enter radio options here:

○ <Developed>
○ <2>
○ <3>

<1> Developed
<2> Undevelo|
<3>

[ Create ]

Fig. 9

QUESTIONS OF ABC WHOLE LOAN POOL

| OPERATIONS |
|---|
| ○ Manage Project |
| ○ Create Question |

*Use Drag and Drop to re-order the questions.*

| | |
|---|---|
| Does the property type match the listed type? ○ Yes  ○ No<br>*Child Question on answer:* No<br>Explain:<br>[_____] | Delete<br>Single Family, Residential - SF<br>Required: Yes |
| Condition:<br>○ Excellent   ○ Good   ○ Poor | Delete   Create Child<br>Single Family, Residential - SF<br>Required: Yes |
| Give the property a grade from 1 to 10<br>○ 10  ○ 9  ○ 8  ○ 7  ○ 6<br>○ 5   ○ 4  ○ 3  ○ 2  ○ 1 | Delete   Create Child<br>Single Family, Residential - SF<br>Required: Yes<br>Min Avg. Rating: 7.00<br>Max Variance: 1.50<br>Max Additional Reviews: 1 |
| Neighborhood Type:<br>○ Developed  ○ Undeveloped<br>○ Planned | Delete   Create Child<br>Single Family, Residential - SF<br>Required: Yes |
| Number of cars on the property?<br>○ 1  ○ 2  ○ 3  ○ 4  ○ 5 or more | Delete   Create Child<br>Single Family, Residential - SF<br>Required: Yes |

Fig. 10

Analyst Registration

*Fields with * are required.*

User Name*

[          ] Choose a user name between 4 and 8 characters.

Name*

[                                              ]

Email*

[                                              ]

Phone*

[                    ]

University*

[                                              ]

School*

[                                              ]

[Register]

Fig. 11

Projects

Total 5 result(s).

RBS — Start
Priority: Normal
DueDate: 12/21/2011
Properties: 1,000
Remaining: 0
Comments:

ABC whole loan pool — Start
Priority: Normal
DueDate: 12/17/2011
Properties: 2,000
Remaining: 1,000
Comments:

GHI Pool — Start
Priority: Normal
DueDate: 12/19/2011
Properties: 3,500
Remaining: 0
Comments: Test of the variance question

Test 2 — Start
Priority: Normal
DueDate: 01/03/2012
Properties: 5,000
Remaining: 0
Comments:

Test Multi-State — Start
Priority: Normal
DueDate: 01/18/2012
Properties: 1,500
Remaining: 500
Comments:

Fig. 12

| | |
|---:|:---|
| Property | Lee:26442703000090210 |
| Listed Property Type | Single Family |
| Assessed Value | 93,345 |
| Year Built | 1992 |
| Year Renovated | 1992 |
| Acres | 0.5021 |
| Property could be as long as | 109 Yards |

*Building might be off image on large (>1 acre) properties. If so use Google & Bing imaging, below, to find it.*

| Google Maps | Bing Maps |
|---|---|

*Questions with * are required.*

**\*Does the property type match the listed type?**
 ● Yes    ○ No

**\*Condition**
 ○ Excellent    ● Good    ○ Poor

**\*Give the property a grade from 1 to 10**
 ○ 10  ○ 9  ○ 8  ● 7  ○ 6  ○ 5  ○ 4  ○ 3  ○ 2  ○ 1

**\*Neighborhood Type:**
 ● Developed
 ○ Undeveloped
 ○ Planned

**\*Number of cars on the property?**
 ○ 1  ○ 2  ● 3  ○ 4  ○ 5

Notes:

[ Submit ]

Fig. 13A

User: John Doe
Number Left to Do: 1
Listed Property Type: Commercial - Apartments
Assessed Value: 8,879,000
Year Built:
Year Renovated:
Acres:
Property could be as long as: 0 Yards
Building might be off image on large (>1 acre) properties -
if so, use Google & Bing imaging, below, to find it
[Google Maps] [Bing Maps]
rows="5" cols="40"
Property Type:
  ○Single Family  ●Apartment  ○Club, Lodge, Union Hall  ○Golf Course
  ○Office  ○Retail  ○Mortuary  ○Night Club
  ○Hotel  ○Mobile Home Park  ○Nursing Home  ○Retirement Residence
  ○Warehouse  ○Land  ○Other  [Clear]
Does the property type match the listed type?
  ●Y    ○N  [Clear]
Condition:
  ●Excellent  ○Fair  ○Poor  [Clear]
Visible Gas Station or Pump on Property: ☐
Parking:
  ●Paved  ○Unpaved  [Clear]
Near main road:
  ●Y    ○N
Further Review:
  ○Yes  ●No  [Clear]

Notes:
[                    ]
Retail - Anchor Store Names:
[                    ]

Fig. 13C

| Go back to list | | | | Does the property type match the listed type? | (CHILD) Explain: |
|---|---|---|---|---|---|
| | Date/Time | Time Spent | Notes | | |
| Mohamad Testing | 12.17.2011 07:12 | 0.2 min | N | Yes | |
| John Smith | 12.17.2011 07:17 | 0.2 min | N | Yes | |
| [admin] (C) | 12.17.2011 13:27 | 0.6 min | Y | Yes | |
| Status & Final Answer | | | | Overridden [Yes] | Overridden [] |

| | |
|---|---|
| Property | Lee:294427040001 6024A |
| Listed Property Type | Single Family |
| Assessed Value | 69,055 |
| Year Built | 2003 |
| Year Renovated | 2003 |
| Acres | 0.5002 |
| Property could be as long as | 109 Yards |

Building might be off image on large (>1 acre) properties. If so, use Google & Bing imaging, below, to find it.

[Google Maps]   [Bing Maps]

Questions with * are required.
*Does the property type match the listed type?
 ●Yes  ○No
*Condition
 ●Excellent  ○Good  ○Poor
*Give the property a grade from 1 to 10
 ○10 ●9 ○8 ○7 ○6 ○5 ○4 ○3 ○2 ○1
*Neighborhood Type:
 ●Developed  ○Undeveloped  ○Planned

*Number of cars on the property?
○1 ○2 ●3
○4 ○5

Notes:
[          ]

[Submit]

Fig. 14A

Manage Analysts

| Name | User Name | Phone | University | School | Status | Date | |
|---|---|---|---|---|---|---|---|
| | | | | | | | Displaying 1-7 of 7 result(s). |
| John Doe | jdoe | 914-444-4444 | Fordham | MBA | Active | 01/26/2012 | Edit |
| Analyst 17 | ana17 | 202-555-5555 | Howard | Business | Active | 01/26/2012 | Edit |
| Mary Smith | msmith | | Duke | Finance | Active | 01/26/2012 | Edit |
| Jane Doe | jdoe | | NYU | Business | Active | 01/26/2012 | Edit |
| Testing | ana2 | 111-111-1111 | My University | My School | Active | 01/26/2012 | Edit |
| John Smith | ana1 | 202-222-2222 | Howard | Business | Active | 01/26/2012 | Edit |
| Administrator | admin | 333-333-3333 | NA | NA | Active | 01/20/2012 | Edit |

Fig. 16

All Projects

| ID | Name | Client | Analyst Group | Priority | Status | Completed | PB | CO | Due Date | | | |
|---|---|---|---|---|---|---|---|---|---|---|---|---|
| 3 | XYZ whole loan | Demo Client | Everybody | Normal | Completed | 2/25 | 0 | 2 | 11/30/2011 | Manage | Dashboard | Reporting |
| 9 | ABC whole loan pool | Demo Client | Everybody | Normal | Active | 8/20 | 4 | 0 | 12/17/2011 | Manage | Dashboard | Reporting |
| 10 | DEF pool | DEF | Everybody | Normal | Completed | 5/5 | 4 | 0 | 12/17/2011 | Manage | Dashboard | Reporting |
| 11 | GHI Pool | ABC | Everybody | Normal | Active | 5/5 | 3 | 0 | 12/19/2011 | Manage | Dashboard | Reporting |
| 8 | RBS | RBS 2011-1A | Everybody | Normal | Active | 5/5 | 0 | 0 | 12/21/2011 | Manage | Dashboard | Reporting |

Displaying 1-5 of 25 result(s).

Operations
○ Create Question

Fig. 17

ABC WHOLE LOAN POOL

Manage Project   Summary Dashboard

⊟ ○ ALL (4,700)
⊞ ☐ By State
⊞ ☐ By Property Category
⊞ ☐ By Rating Bracket
⊞ ☐ By Does the property type match the listed type?
⊞ ☐ By Condition:
⊞ ☐ By Neighborhood Type:
⊞ ☐ By Number of cars on the property?

▭ Dashboard    ▦ List

Filters: (None)

- You may apply additional filtering by entering partial text or using comparison operations <, <=, >, >=, =, <> or = in the text fields below the headers.
- You may sort the list by clicking on a column header.

Clear Additional Filters                                                                    🔍  ✕

Displaying 1-4 of 4 result(s).

| ID | Street | City | State | Zip | County | Property Type | Rating | Value | Loan Amount | LTV | Notes | Does the property type match the listed type? | Condition: | Neighborhood Type: | Number of cars on the property? |
|---|---|---|---|---|---|---|---|---|---|---|---|---|---|---|---|
| | | | | | | | | | | | | | | | |
| 179 | 707 EIGHTH AVE | LEIGH ACRES | Florida | 33972 | Lee | SF | 5.00 | $63k | $39k | 62.0% | | Yes | Good | Developed | 2 |
| 181 | 203 W 6TH ST | LEIGH ACRES | Florida | 33972 | Lee | SF | 10.00 | $69k | $23k | 33.8% | | Yes | Excellent | Developed | 3 |
| 182 | 716 MCKINLEY AVE | LEIGH ACRES | Florida | 33972 | Lee | SF | 6.00 | $97k | $32k | 33.0% | | Yes | Good | Developed | 4 |
| 183 | 418 HIBISCUS AVE | LEIGH ACRES | Florida | 33972 | Lee | SF | 7.00 | $66k | $32k | 48.7% | lawn looks brown (by admin). | Yes | Good | Developed | 1 |

Fig. 19

SYSTEM AND METHOD FOR MASS VISUALIZATION OF REAL ESTATE PROPERTIES

This application claims the benefit of U.S. Provisional Patent Application No. 61/594,601, entitled "Mass Visualization of Real Estate Properties," filed on Feb. 3, 2012, which application is incorporated by reference in its entirety.

FIELD OF THE INVENTION

The invention relates to a system and method for mass visualization of real estate properties, which can be used by entities carrying loans secured by real estate, by government agencies wishing to assess the potential legitimacy of businesses requesting grants or reimbursements from government programs, and other entities that might benefit from the ability to visualize the external condition of real estate properties.

BACKGROUND OF THE DISCLOSURE

In the past, performing active diligence on large portfolios of residential and commercial real estate properties required significant time and financial investment. One technique used to investigate real estate properties in question is a "drive-by" technique, where an individual is paid to drive by the properties and take several photographs. These photographs must then be analyzed usually by the institution personnel. In addition to the cost of such analyses, the photographer is paid for the time and effort; usually about $65.00 per property. A secondary method, used under certain circumstances, involves obtaining a real estate "broker price opinion" (BPO), which is essentially a "mini-appraisal." Obtaining a BPO costs about $150.00 per property. Thus, if a lending institution, government agency or other entity needs to look at several thousand properties, the financial burden is potentially enormous. In addition, the number of employees required to accurately analyze the photographs requires additional financial and time investment. Further, it is difficult to keep an ongoing surveillance on properties over the entire life of the loan, or asset. For these and other potential reasons, none of these prior art options is timely or cost-effective. Thus, there is a need, especially in today's economy, for an inexpensive and time-efficient method and system of investigating and evaluating the status of real estate properties.

BRIEF SUMMARY OF THE INVENTION

The invention relates, in one aspect, to a method of assessing real estate properties comprising: (a) obtaining geocodes for each of the real estate properties based on the addresses or assessor parcel numbers; (b) obtaining at least two images of each of the real estate properties from an aerial vendor; (c) inputting the list of real estate properties, the addresses or assessor parcel numbers of the real estate properties, the geocodes for the real estate properties, and images of the real estate properties into a database; (d) providing access to the database via a graphical user interface; (e) displaying all of the images of a selected one of the real estate properties via the graphical user interface; and (f) providing the facility via the graphical user interface to rate the real estate properties. The described method of assessing real estate properties may further include steps of receiving via a computer a list of real estate properties; and obtaining the addresses or assessor parcel numbers for the real estate properties included in the list.

The invention further relates, in one aspect, to a method of analyzing a group of real estate properties comprising: (a) providing a first analyst access, via a graphical user interface on a computer, to a database including a list of real estate properties, the addresses and/or assessor parcel numbers of each of the real estate properties, geocodes for each of the real estate properties, at least two images of each of the real estate properties, and a list of questions for completion while viewing all of the images of one of the real estate properties via the graphical user interface relating to the condition or status of a viewed real estate property from the list of real estate properties; (b) providing a second analyst access, via a graphical user interface on a computer, to the database; (c) storing the first analyst's answers to the questions relating to the condition or status of each viewed real estate property from the real estate properties in the database; (d) storing the second analyst's answers to the questions relating to the condition or status of each viewed real estate property from the real estate properties in the database; (e) comparing the first analyst's answers to the second analyst's answers; and (f) flagging any inconsistent results in the database for further review.

The database used in connection with the foregoing system and/or method may include any of the following: a list of real estate properties; the addresses and/or assessor parcel numbers of the real estate properties; geocodes for the real estate properties; detailed images of the real estate properties; and a list of questions relating to the condition or status of the real estate properties.

Other systems, methods, features, and advantages of the present invention will be or will become apparent to one with skill in the art upon examination of the following figures and detailed description. All such additional systems, methods, features, and advantages are included within this description, are within the scope of the invention, and are protected by the accompanying claims. Accordingly, the present invention is not restricted except in light of the attached claims and their equivalents.

BRIEF DESCRIPTION OF THE FIGURES

For a better understanding of the present disclosure, non-limiting and non-exhaustive embodiments are described in reference to the following drawings. In the drawings, like reference numerals refer to like parts through all the various figures unless otherwise specified.

FIG. 4 illustrates one potential graphical user interface for creating a project for property analysis.

FIG. 5 illustrates one potential graphical user interface with an exemplary list of properties in a real estate analysis project.

FIGS. 6-9 illustrate potential graphical user interfaces for selecting and creating questions to be used in the analysis of real estate properties.

FIG. 10 illustrates one potential exemplary list of questions created using the graphical user interface of FIGS. 6-9.

FIG. 11 illustrates one potential graphical user interface for an analyst registration screen.

FIG. 12 illustrates one potential graphical user interface with an exemplary list of projects for review by analysts and/or project managers.

FIGS. 13A-13B together illustrate one potential graphical user interface for analyzing an exemplary single family property.

FIGS. 13C-13D together illustrate one potential graphical user interface for analyzing an exemplary apartment complex property.

FIGS. 14A-14B together illustrate one potential graphical user interface for viewing results of a property analysis.

FIG. 16 illustrates one potential graphical user interface for management of the property analysts in accordance with one implementation of the present system.

FIG. 17 illustrates one potential graphical user interface for providing an exemplary list of projects in accordance with one implementation of the present system.

FIG. 19 illustrates one potential project dashboard for one exemplary real estate property project in accordance with one implementation of the present system.

DETAILED DESCRIPTION OF THE INVENTION

Figure 1:
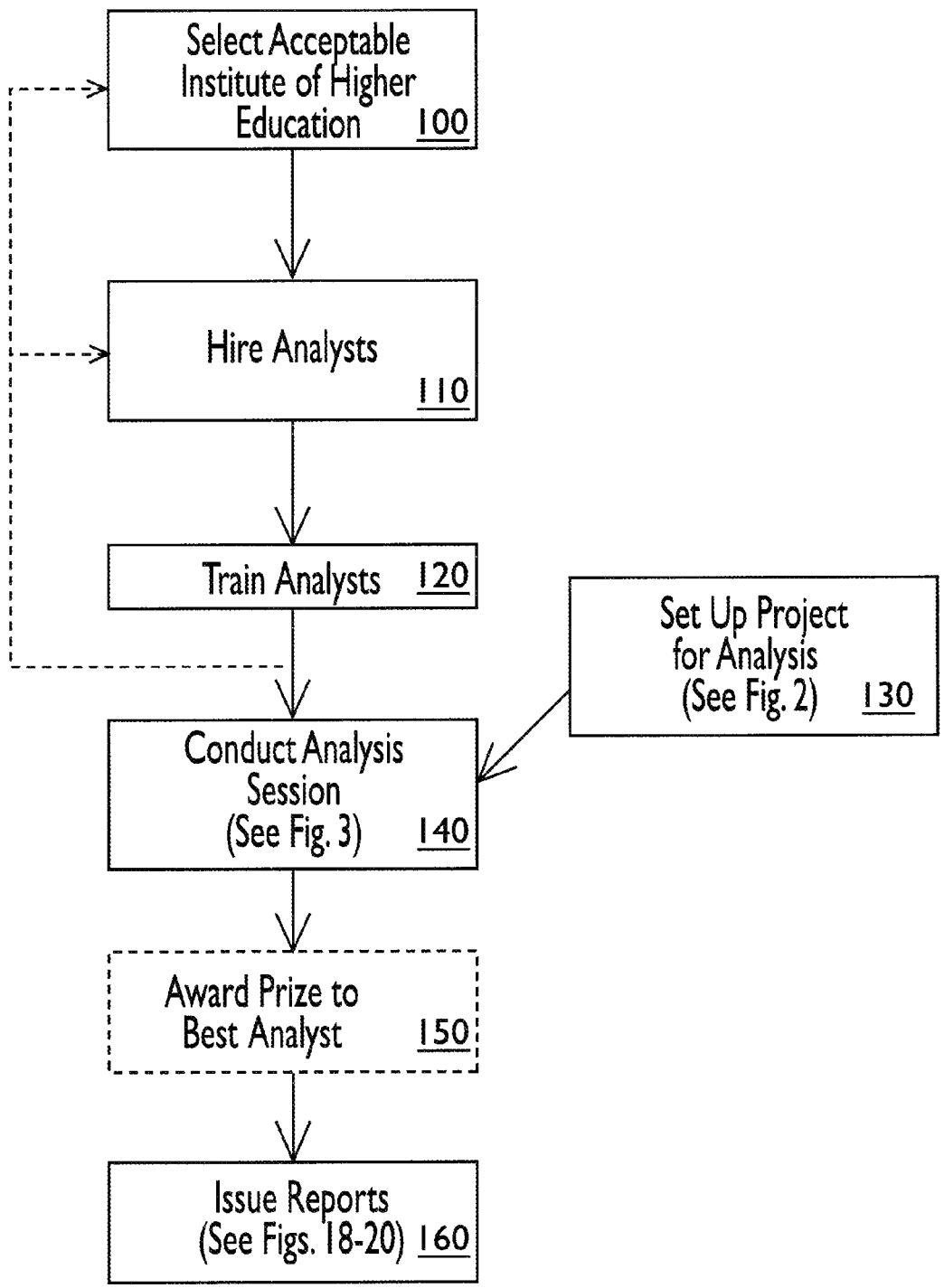
FIG. 1 illustrates one potential flow of a method of analyzing or otherwise assessing real estate properties.

The invention relates in one aspect to a method of assessing real estate properties comprising: (a) obtaining geocodes for the real estate properties based on the addresses or assessor parcel numbers; (b) obtaining detailed aerial images of the real estate properties from an aerial vendor; (c) inputting the list of real estate properties, the addresses or assessor parcel numbers of the real estate properties, the geocodes for the real estate properties, and detailed images of the real estate properties into a database; (d) providing a computer having access to the database via a graphical user interface; (e) viewing the detailed images of the real estate properties; and (f) rating the real estate properties. The described method of assessing real estate properties may further include steps of receiving a list of real estate properties; and obtaining the addresses or assessor parcel numbers for the real estate properties included in the list.

In another aspect, the invention relates to a method of analyzing a group of real estate properties comprising (a) providing a first analyst access, via a graphical user interface on a computer, to a database including a list of real estate properties, the addresses and/or assessor parcel numbers of the real estate properties, geocodes for the real estate properties, detailed images of the real estate properties, and a list of questions relating to the condition or status of the real estate properties; (b) providing a second analyst access, via a graphical user interface on a computer, to the database including the list of real estate properties, the addresses and/or assessor parcel numbers of the real estate properties, geocodes for the real estate properties, detailed images of the real estate properties, and a list of questions relating to the condition or status of the real estate properties; (c) storing the first analyst's answers to the questions relating to the condition or status of the real estate properties in a database; (d) storing the second analyst's answers to the questions relating to the condition or status of the real estate properties in a database; (e) comparing the first analyst's answers to the second analyst's answers; and (f) flagging any inconsistent results in the database for further review.

The database in accordance with one implementation of the foregoing system and/or method may include any of the following: a list of real estate properties; the addresses and/or assessor parcel numbers of the real estate properties; geocodes for the real estate properties; detailed images of the real estate properties; and a list of questions relating to the condition or status of the real estate properties.

In another aspect, the invention relates to a system and method for providing an independent "bird's eye view" of real estate assets through a graphical user interface on a computing device used by analysts trained to use such software to analyze real estate properties. As would be understood by one of skill in the art having the claims and specification before them, the invention can be scalable to provide the ability to perform hundreds of thousands of visualizations, and can provide a cost effective means to provide immediate answers to client questions through use of the inventive process and Internet technology.

The system and method disclosed in the present application are preferably used by, or work with, institutes of higher education, including colleges and graduate schools, especially those offering Masters in Business Administration, Finance, and/or Real Estate programs. A university or other institute of higher education can be chosen to work with the present system based on the availability of a desirable number of students in appropriate educational programs, an on-campus computer facility for the analysts having high-speed, large bandwidth Internet access, and professors or other faculty willing and able to proctor the analysts during analysis sessions. The facility can be located on- or off-campus. The analysts would preferably be available on an "as-needed," part-time basis to review and analyze the real estate properties in question. The professors, or other proctors, can assist in the selection of the analysts and the training of the diligence course.

This association between the present system and each university and graduate business school would provide real-world experience to the campus and students, and provide training and work experience for them. The students' involvement with the present system would help jump start their focus on real estate in the business school, increase corporate sponsorship, and help establish the school as a leader in solutions for property-related issues. Participation in the program allows the students to increase real-world analytical skills, learn about risk assessment on a first-hand basis, earn a competitive hourly salary for an on-campus job, have the potential for a site review with potential full-time employers, and increase the marketability of the resume (e.g., include a line item as a due diligence analyst and obtain letters of recommendation).

The system and method has applicability beyond real estate valuation. For example, financial branches of the federal and state governments (e.g., the Federal Housing Finance agency, Freddie Mac, Fannie Mae, Ginnie Mae, the Federal Deposit Insurance Corporation (FDIC), and the Department of Housing and Urban Development (HUD)) have interests in the state of the housing market and loans made therefore. In addition, agencies in the Department of Health and Human Services (e.g., Medicare, Medicaid, and the Statue Children's Health Insurance Programs (SCHIPS)) can use the inventive system and method to investigate the locations of alleged vendors under these (and other) government programs. For example, if a government agency suspects that a provider is using a real estate property as a "sham" operation, use of the invention, by visualizing the property can make at least an initial determination if the operation is legitimate or not.

Another exemplary use relates to the investigation of properties after a disaster. An insurance company, for example, might wish to visualize the damage caused by a natural disaster such as a hurricane, tornado, or earthquake, so that company can quickly assess the magnitude of the loss soon after the disaster.

Thus, the invention gives an institution or other user the ability to put "eyes on their properties." This ability assists portfolio managers and surveillance professionals in understanding the external conditions of the properties and the trend of a portfolio of properties. In addition, the institution can be more efficient and effective in on-site diligence. The invention also provides an independent bird's-eye view of a complete real estate portfolio.

FIG. 1 illustrates one potential flow of a method of analyzing or otherwise assessing real estate properties, in accordance with one implementation of the invention. First, an acceptable institute of higher education is located and selected 100. The institute of higher education is preferably a college or graduate school, especially one offering Masters in Business Administration, Finance, and/or Real Estate programs. In one implementation of the invention, an institute of higher education may be deemed "acceptable" if it has on its premises, or has access to, a computer facility with high-speed, high-bandwidth Internet access available on an as-needed basis for use in visualizing real estate properties. However, one of skill in the art would understand that other criteria may be implemented to determine whether an institute of higher education is "acceptable." The facility preferably is located on campus of the institute, but can also be located off campus.

As would be understood by those of ordinary skill in the art having the present specification, figures, and claims before them, other sources of skilled labor may be used to supply analysts. Such sources of skilled labor may include, but may not necessarily be limited to staffing agencies and businesses set up to provide skilled people. Preferably, any source of skilled labor is designed to provide temporary employment. In this way analysts will be available when needed and released when not needed. While such modifications are contemplated, the invention will be described in the context of using members of college/university community with the understanding that other approaches to staffing may be substituted as appropriate.

The next step is the hiring of individuals to act as analysts for one or more real estate analysis projects 110. Preferably, the hired individuals comprise selected students attending the selected institute, and such students are preferably upperclass undergraduates or graduate students in business administration, finance, a real estate program, or similar program. However, the present system and method is not limited to use of students as analysts. The analysts may include without limitation professors, teaching assistants, and members of the community. The steps of selecting the institute of higher education 100 and hiring analysts 110 can be repeated as necessary to cover all projects. That is, one or more institutions, each with a set of analysts, can be used for one project or a plurality of projects as appropriate, particularly if a project or set of projects includes a large number of properties to be visualized. If more than one institution is used, these institutions can be selected in the same region, or in different geographic areas to provide differing student perspectives, and to even provide advantages such as due to time zone differences that can assist in distributing one or more projects for quicker completion.

After being selected, the analysts may be trained 120. Such training may be performed by professors of each institution participating in the program, or by off-campus training staff hired to train the analysts and/or oversee the visualization projects. The training may take place in a classroom setting, on a one-to-one basis, or online (such as via a webinar or other remote training mechanism), and may generally include, without limitation, showing the analysts representative photographs of the type that will be provided during actual real estate analysis projects, and educating the analysts on how to properly review, assess and analyze the photographs to result in an accurate and consistent report and ratings. In addition to such substantive training, the analysts may also be trained on software functionality and operation, including without limitation how to log in, run reports, enter data, view information, and navigate through the various graphical user interfaces.

During the training period, preferably photographs of various example properties are shown to the trainees along with property data, and the trainees are lectured on how and why the example properties were given certain ratings, values and/or responses to the prompted questions. The analysts can also be provided with training on highlighting one or more features that may have been important to their rating of a property. For example, if the house on the property has a crack running down a wall, the analyst may be trained to highlight the crack as being important in the analysis of the property. After completion of the training period, trainees may be required to pass a test or other assessment before working as a trained analyst to help maintain quality control and consistency among analysts.

Before beginning any real estate property analysis for a given project, the project may be set up for analysis 130 (see FIGS. 2 and 4-10), preferably by an administrator or manager of the project. As described in greater detail below, the step of setting up a project 130 may generally include obtaining and loading of a list of selected or predetermined properties for that project, and obtaining data and aerial photographs relating to each such property. Aerial photographs may be provided by aerial vendor partners, such as Pictometry International Corp of Rochester, N.Y. Other photographs can include satellite photographs of the properties and of the surrounding neighborhoods, which can also be obtained from third parties such as, for example TerraServer of Raleigh, N.C. or other satellite photography providers. Additional photographs, maps and/or other data relating to the properties can be obtained via search engines. For example, search engines such as Google and Bing may provide additional visual information which the analysts may use to assess the properties. Also, during the project set up step 130, questions can be formulated by either the client or provider, to be answered by the analysts during the project analysis session. Example implementations of the project setup are described in greater detail below with respect to FIG. 2 and FIGS. 6-10.

Once an analyst is trained, he or she may be assigned to one or more projects to conduct an analysis sessions 140 (as described in greater detail below). When conducting an analysis 140, the analysts are shown property listings that include both photographs and other property data. The data can include, but is not limited to, the address (e.g., street, unit number, if necessary, city, state, and zip code), the type of property (e.g., single family, multi-unit apartment building, commercial, etc.), the status of the property (e.g., rented, in foreclosure, under contract, etc.), and any other data gathered on the property. The analysts then give ratings to each property in response to a series of questions that are presented to the analysts along with the photographs. When an analyst indicates he or she has finished with a property, another property may be displayed on the screen for analysis. While (or before or after) an analyst analyzes his or her assigned properties, statistical data may be collected regarding the analyst's work, such as the number of properties analyzed per hour, the quality of the analyst's performance, and other characteristics of the analyst's performance.

In addition to a first analyst having analyzed a particular property 140, one or more other analysts, whether or not in the same room and whether or not in the same institute, may also analyze the same property. Because each analyst is automatically provided with a queue of one or more properties, it is possible (and in fact preferred) that each property be reviewed by one or more analysts. In this manner, any discrepancies between first and second analysts may be flagged for additional review by the project administrator or an in-room proctor. In some implementations, if certain errors or discrepancies arise, the proctor or administrator can use the results to retrain the analyst in real time. Also, in some implementations, the number of analysts assigned to review a given property may vary depending upon various factors including, for example, the level of experience of the analyst, the number of discrepancies arising from a particular analyst's work, and the analyst's overall quality of performance.

After an analysis session is completed, the project manager or administrator may review the analysis results (see FIGS. 16-17). In some instances one or more prizes, rewards or other incentives can be awarded to the top analyst(s) 150. For example, a top analyst can be offered employment by a real estate and/or financial institution or can be given a recognition reward or other prize, including, but not limited to gift cards or other monetary award. After the project analysis is complete, reports can be generated 160 (see FIGS. 18-20). The administrator can also normalize the answers between analysts by using statistical analysis and other tools, to improve the usefulness of the analysts to the system. For example, if one analyst's ratings are generally lower than another analyst's ratings by normalizing the medians of the respective analysts a more homogeneous data set may be provided. Note that step 150 is optional, and the order of steps 150 and 160 may be reversed, as would be understood by one of skill in the art.

Figure 2:
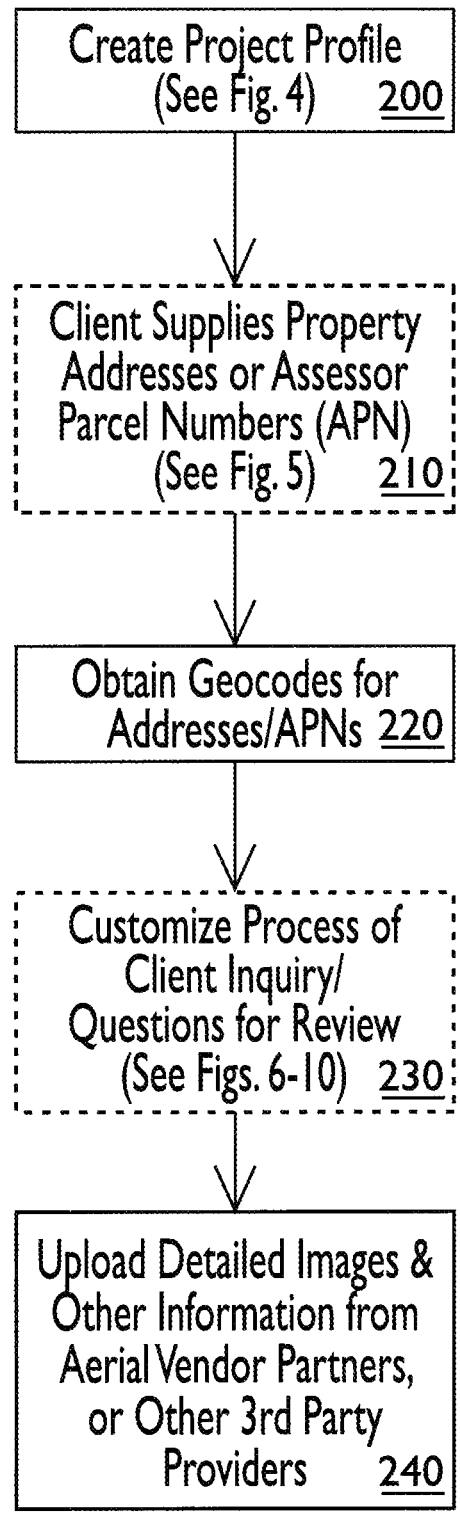
FIG. 2 illustrates one potential flow for setting up a project relating to a set of real estate properties.

The process of setting up a project (step 130 in FIG. 1) will now be described in detail with respect to FIG. 2. FIG. 2 illustrates one potential flow for setting up a project relating to a set of real estate properties. It will be understood by one of skill in the art that this step or process of setting up a project may be performed prior to, contemporaneously with, or after one or more of the selection (100), hiring (110) and/or training (120) steps discussed with respect to FIG. 1. First, a profile for the project may be created 200. FIG. 4 illustrates an example implementation of a screen shot for one potential graphical user interface that can be presented to a user at the beginning of a project to create the project profile 200. For example, in order to set up a project, information relating to the client (e.g., ABC Bank) may be input into the system and stored in a database. As shown in the example screen shot of FIG. 4, the client may be identified, the project may be given a name and description, and additional information as shown in the Figure may be input as part of the project profile. The additional information may include, but is not limited to the group of desired analysts, the due date, the priority of the project, project status, number of required reviews, and administrator comments. Next, the analysts for the project can be selected. The selection of analysts can be based on analyst location, analyst school affiliation, status of the analysts within their school or program, prior performance, or any other method of selecting the analysts for a given project. The selection can call for all registered analysts or only selected analysts. Other information regarding the project can be provided at the beginning of a real estate visualization project. For example, information regarding the due date of a project, the priority of a project (e.g., is data needed on a rush basis?), the status of the project, the required number of reviewers per property, and any project manager comments may be input into the graphical user interface and/or otherwise saved into the database.

The process of setting up the project may further include receiving a list of real estate properties from the client, which may include associated addresses and/or corresponding assessor parcel numbers (APN) 210. In addition or alternatively, the list may include other information that allows the system to identify the properties, such as a geocode (longitude-latitude codes). After the list of properties is received from the client, if geocodes for the properties/APNs are not provided, this information may be obtained 220. For example, using the addresses, the APNs and/or the geocodes, the exact GPS coordinates can be derived for each property using known software platforms or applications, including for example Google Maps Geocoding API V2 (available at https://developers.google.com/maps/documentation/geocoding/v2/index).

The process of setting up the project may optionally include entering specific questions to be answered by the analysts during the project 230 (see FIGS. 6-10). These questions may be selected from a set of predetermine common questions, however preferably, the questions may be created and customized by the client. FIGS. 6-9 illustrate potential graphical user interfaces for selecting and creating questions to be used in the analysis of real estate properties, and FIG. 10 further illustrates one potential exemplary list of questions created using the graphical user interface of FIGS. 6-9.

FIG. 6 illustrates, for example, that questions may be created on a property-type by property-type basis. For instance, questions a lender may be interested in for a commercial-office property may not be the same questions used for a single-family home analysis. In this regard, one or more property types may be selected such that the created questions will be posed in instances of those selected types of property. In the illustrated example, residential property types that can be selected may include, but are not limited to, a single family house, a recreational vehicle (RV) park, manufactured housing, a multi-family dwelling (e.g., an apartment building or mulitplex), and a mobile home park. Commercial properties that can be selected may include, but are not limited to, retail properties, hotel properties, storage properties (mini-storage and larger storage facilities), parking lots or structures, commercial apartments, offices, warehouses, industrial facilities, religious properties, restaurants, golf courses, specialty properties, and even vacant land. As illustrated in FIG. 6, the client can input the text for a question, designate the question as required, and select from a variety of preprogrammed answer types, such as free form text, rating on a numerical scale, Yes/No, Excellent/Good/Fair/Poor, or customized radio buttons. Each of these questions can be customized by the client, including even the direction of the ratings scale, which can also be selected here (horizontal or vertical). Ratings can be from 1 to 10, or any range desired by the client (e.g., 1 to 5, 1 to 25, or 1 to 100). For instance, the custom options could be used with a property question related to the number of vehicles found on a property with the first button being "3 or more," the second button being "2" and the third button being "1". In an implementation where the number of vehicles is to be counted, there is a possibility that the term "vehicle" can be defined differently by different analysts. For example, one might consider only cars as vehicles, while another might include motorcycles and/or boats in their definition of vehicles. It is contemplated that these definitions can be addressed in a questionnaire to be completed by the client, or otherwise addressed in the training of the analysts. Once the client (or other author) has completed a customized question, the "create" button may be selected to save the question (and any related customizations or other data) in the database.

FIG. 7 illustrates the creation of a question by a client (or other author) for golf courses only. Here, an analyst presented with a property type that is a commercial golf course will be required to answer the question "Is the course well-maintained?" in a free-form text response. For example, an analyst can describe the condition of the bunkers, greens, fairways, tee boxes, etc. The analyst may even use this answer to indicate that a photograph was taken at the "wrong" time of the year (e.g., there is snow on the course), such that the condition of the course cannot be determined without new photographs. Again, once the client (or other author) has completed a customized question, the "create" button may be selected to save the question (and any related customizations or other data) in the database.

FIG. 8 illustrates the creation of a question by a client (or other author) to be answered by analysts in connection with analysis of residential single family homes. Here, an analyst presented with residential single family homes will be required to rate the overall condition of the house on a scale of 1-10. The client/author has also customized the question in the example such that the rating numbers are presented horizontally, and has required a minimum average rating, maximum allowed variance, and maximum number of additional reviews required should the maximum variance requirement not be met by the previously input data. For example, if the property has been evaluated by two analysts via the system with one the first analyst rating the property a Complete.J.M.2 out of 10 and the second analyst answered with 5 out of 10, the resulting property average would be 3.5. As this average is below the minimum average rating of 4 (shown in the example of FIG. 8), an alert flag would be triggered by the system. Under this example, neither input exceeds max variance. But as illustrated in FIG. 8, if the variance did exceed the user-input maximum (input to be 2.35 in the illustration), two additional reviews would be queued for subsequent review with the hope being that the variance would be reduced by the inclusion of more results in the average. As above, it should be understood that these options and questions are further customizable for the particular category of properties. Again, once the client (or other author) has completed a customized question, the "create" button may be selected to save the question (and any related customizations or other data) in the database.

FIG. 9 illustrates the creation of a question by a client (or other author) to be answered by analysts in connection with analysis of residential mobile park homes. Here, an analyst presented with a residential mobile park home will be required to identify the type of property by responding in a manner specified by the client/author. In this example, rather than utilizing a predetermined type of response, the client/author has selected "Custom Options" as the Question Type. When, as in this example, a custom question type is included, the client/author may specify parameters for the response, such as a list of customized radio buttons set in a horizontal alignment. In this example, the client/author may provide three (or any number of) options for responding to the question "What type of property" (e.g., (1) Developed; (2) Undeveloped; (3) Planned). Again, once the client (or other author) has completed a customized question, the "create" button may be selected to save the question (and any related customizations or other data) in the database.

FIG. 10 further illustrates one potential exemplary list of questions, specifically for residential single family homes, created by repeated use of the graphical user interfaces illustrated in FIGS. 6-9. In a preferred implementation, the client (or other author) may further customize this list by re-ordering the list of questions using drag-and-drop functionality or any other known means of re-ordering lists in a computer program, such as for example using a touch screen to reorder the questions. As illustrated, the questions can be customized any number of ways. For example, a required question may be created asking if the property in question matches the listed property description, requiring a "Yes" or "No" response. The client/author may be given an option to further customize this particular question by adding a "child" question, for example, requesting an explanation if the property type does not match the listing. Another required question may ask the analyst to assign a grade to the property on a scale of 1 to 10 (or some other scale as may be specified by the client/author when creating the question). As illustrated, the client/author may further customize this question by setting parameters around this question. For instance, the example illustrated in FIG. 10 sets the minimum average grade as 7.00, with a maximum variance of 1.50, and limits the number of additional reviewers to 1. One of skill in the art having the specification and claims before them would understand that these or other questions can be added, deleted, further customized or otherwise modified. For example, as illustrated, follow-up "child" questions can be set up to correspond to any of the individual question-and-answer sets by clicking on a "Create Child" button.

Returning to FIG. 2, the setup process may further include uploading to the project database images and other information for the property being analyzed 240. In one implementation of the invention, geocodes and/or GPS coordinates may allow for selection of detailed aerial images from an aerial vendor partner to be uploaded 240. Use of the exact latitude and longitude coordinates of a property to be analyzed eliminates inaccuracy that is commonly found in standard web mapping sites. Other information corresponding to a real estate property can also be uploaded to the project database and associated with their corresponding property records, such as the type of property (e.g., single family residence, commercial, industrial), last sale price, property taxes paid, and the like. This type of data can be provided by a variety of companies, such as real estate title companies, and demographic data providers. In addition, other information relating to the analysis itself may be automatically ascertained by the system and then saved in the project database including, but not limited to, the date of the current property review, the number of times a property was reviewed, the status of the property and its review, any problems associated with the property, the property rating, any variance between reviews and/or reviewers, and other similar metrics.

Once the property and image data are loaded into a project database, they can be displayed to the analysts and clients. FIG. 5 illustrates a potential graphical user interface showing an exemplary list of properties that has been uploaded in one potential illustration of the present system, and the progress for the identified projects. As shown in FIG. 5, the graphical user interface may depict additional information regarding the project and analyses, including status of the project (e.g., Active or Completed), status of particular properties in that project (e.g., Active, Problem, Overridden), identification of any problems and/or conflicts corresponding to any of the properties in the project, number of answers submitted ("SBM") and whether the client overrode an analysis ("CO") (see FIG. 5).

Figure 3:
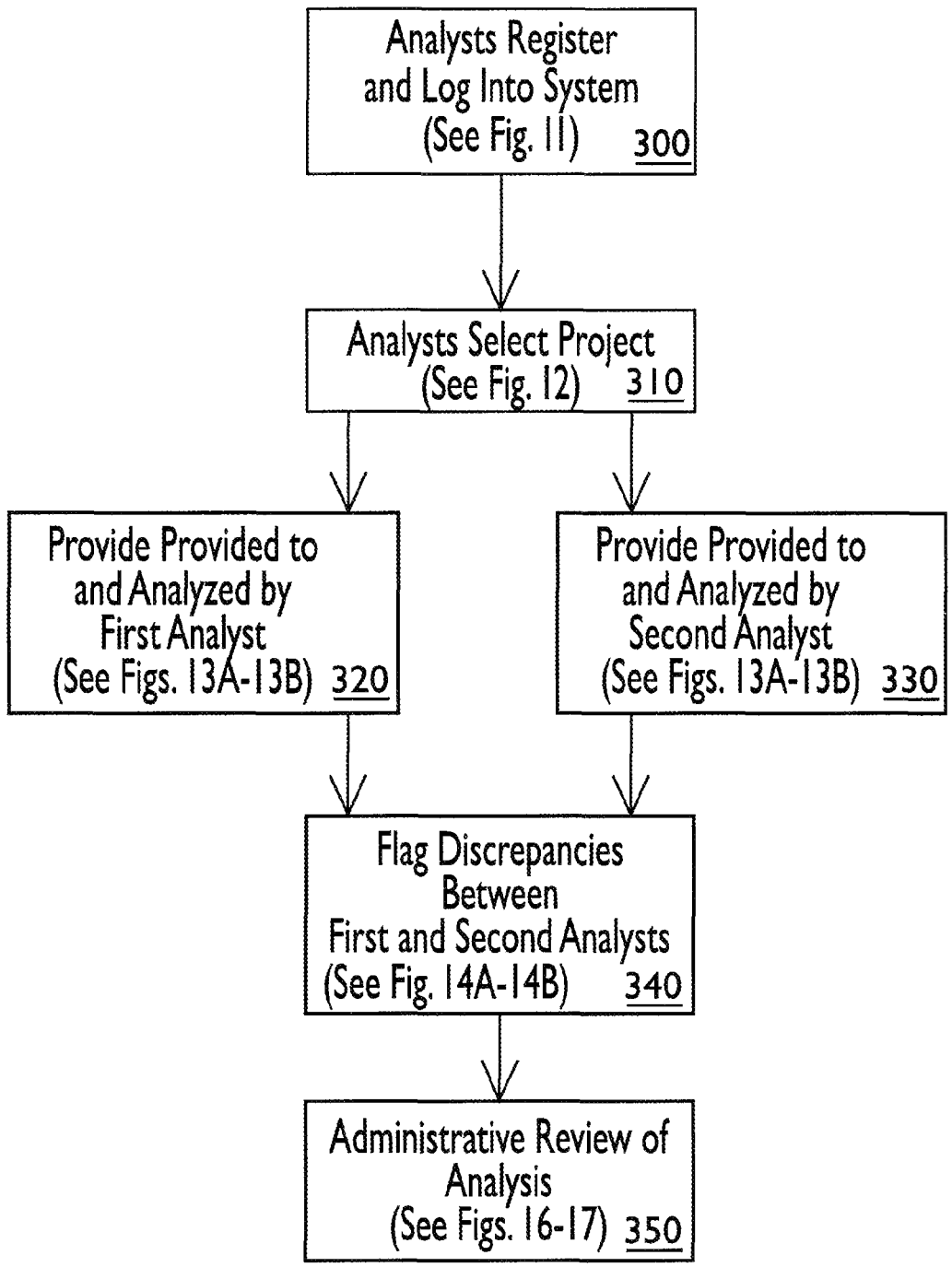
FIG. 3 illustrates one potential flow for analysis of properties by one or more analysts.

Returning to FIG. 1, once the project is set up 130, the analyses may be conducted 140. FIG. 3 illustrates one potential flow for analysis of properties by one or more analysts (step 140 of FIG. 1). In this example implementation, the analysts selected for a project may be required to register (if not already registered) and log into the system 300, and then select a project and/or property for analysis 310. FIG. 11 illustrates one potential graphical user interface for an analyst registration screen. Prior to first logging into the system, the analysts may be required to register as an analyst by entering certain required user information including, but not limited to, a user name, the analyst's full name, e-mail address, phone, the university in which the analyst is enrolled (if applicable), and the school division/department in which the student is taking classes and/or earning a degree (if applicable). Once this information is completed, the analyst can select "register" to submit the information, or perform some other action to complete the registration process. After completing registration, that registration may be reviewed by an administrator. Where the administrator is a professor or other local supervisor they may be familiar with the proposed analyst candidate making approval quick. Once the analyst is approved and the user account established, the analyst may be ready to log in to begin an analysis session. It will be understood by one of ordinary skill in the art that any number of designs for a log-in screens can be implemented. In one aspect of the invention, upon logging into the system to begin property analysis, the analyst may be presented with a selection of projects from which to choose, through the graphical user interface. FIG. 12 illustrates one implementation of a graphical user interface showing an exemplary list of projects that an analyst may be presented with once logged in to the system. In this example implementation, in order to select a project, the manager or analyst may select a "Start" button associated with one particular project to begin working on the particular analysis.

Returning to FIG. 3, in a preferred implementation of the invention, each property may be provided to and analyzed by at least two different analysts 320, 330, such that their analyses can be compared and contrasted. In such an implementation, each analyst assigned to a particular property will be provided with information corresponding to such property. Having multiple analysts conducting a property analysis may likely increase consistency of the analysis results. Any significant discrepancies between the two (or more) analysts' evaluations would be automatically flagged for further review by an in-room proctor or other administrator 340. Any conflict or discrepancy that may be flagged will typically be due to widely disparate ratings by two (or more) analysts. As previously explained, clients can designate an acceptable level of variation or standard deviation between analyses for their projects, on a project, a question-by-question or property-type basis, or otherwise. Where the variation is too high, the system will notify a supervisor (e.g. an in-room proctor or other administrator) who may then review the property/response screen and assign the final values to the property. Further, any property that receives a low grade from at least two analysts, e.g., below 3 (see the setting of the minimum average rating in FIG. 8), is viewed at least one more time. In addition, an in-room proctor or other administrator can review and monitor the analysis as well as analyst performance 350. In the event the in-room proctor or other administrator reviewing and monitoring analyses and analyst performance finds discrepancies or otherwise identifies low or poor performance from an analyst, additional training may be provided to that analyst in real-time. Random quality control reviews may also be conducted. The client may also be given the ability to rate (and in some instances modify) the evaluations of the properties after the team's analyses have been provided to the client for review. In all instances, an audit trail may be saved with the data to allow for further quality control, training, and audit functionality.

In one aspect of the invention, upon flagging and/or reviewing an analysis (340, 350), an administrator may be able to override an analyst's rating(s) or other responses if a conflict or discrepancy with another analyst's rating(s) or responses is identified. Other problems that may be corrected by an in-room proctor or other administrator include low ratings that exceed a predetermined maximum variance. These problems may be identified and corrected via a graphical user interface such as the exemplary screen shown in FIG. 5 with a listing of properties in the project. In flagging or reviewing an analysis (340, 350) or otherwise navigating through a project or series of projects, a user (whether it be an analyst, proctor or other administrator), can also move from the project/property listing as exemplified in FIG. 5, to other graphical user interfaces that allow the user to create or update projects, upload properties to a selected project, or manage the questions to be used with respect to a particular project, as further described herein.

Figure 13B:
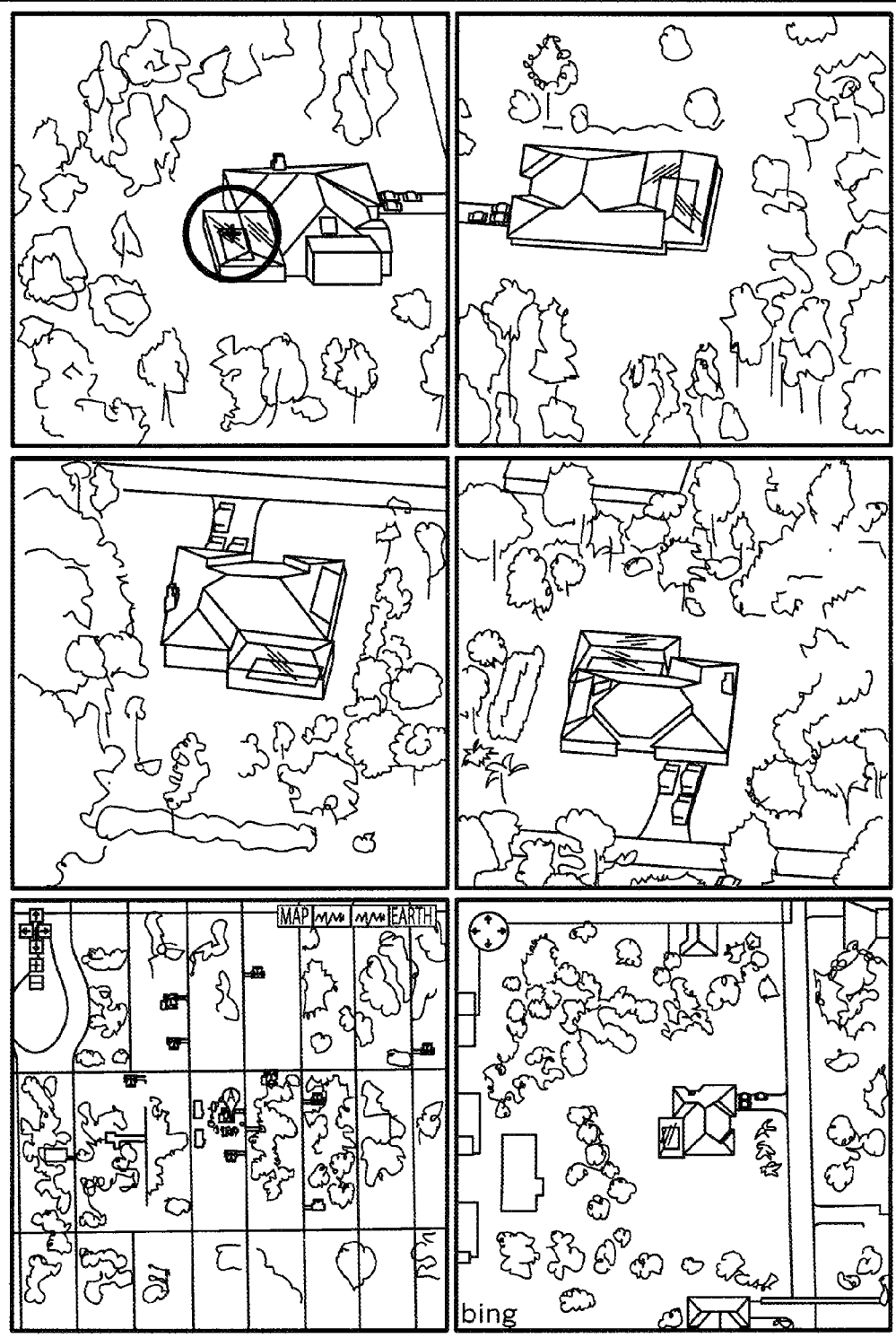

FIGS. 13A and 13B together illustrate one potential graphical user interface via which an exemplary single family property is provided to and analyzed by an analyst (320, 330). FIG. 13A illustrates a potential sample questionnaire to be filled out by an analyst in connection with his/her analysis of the exemplary single family property, and FIG. 13B illustrates one potential array of aerial photographs, maps and/or other images for the exemplary single family property, which were previously uploaded as explained in connection with FIG. 2. The photos, maps and/or other images associated with a property and shown via the graphical user interface may include, for example, satellite views of the property and/or the result of a search using a third party software program or platform such as, for example, Bing or Google Maps. In one potential graphical user interface, FIGS. 13A and 13B constitute one screen presented to the analysts for review on a single computer monitor. Alternatively, FIGS. 13A and 13B can be viewed as separate interfaces on separate screens. A similar (if not identical graphical user interface may be provided to the supervisors to conduct their supervisory reviews and corrections and to client to audit the work of the company.

As previously explained with respect to FIG. 2, when setting up the project, photos, maps or other images for each property may be obtained and selected on the basis of the address and/or APN. The property views can then be further (and more accurately) identified using GPS coordinates (e.g., latitude and longitude). Preferably, the photographs, maps and other images provide different views (e.g., north, south, east, and/or west) of the same property or location (e.g., latitude and longitude), and may include one or more photographs from a satellite, and/or one or more photographs obtained from a search engine such as Google Maps or Bing Maps. The photographs, maps and other images are uploaded to the database, typically as fixed photographs or images which cannot be manipulated. However, as illustrated in FIGS. 13A and 13B, there can be hyperlinks included on each property page to one or both of Google Maps and Bing Maps (or other mapping platform). These hyperlinks can be in the form of a clickable button, or any other method of linking two or more pages.

Upon clicking one of these links (where provided) the analyst may be provided with a view of the relevant map centered on the latitude-longitude (GPS) values associated with the property under review, which is facilitated by exporting latitude-longitude information regarding the property being analyzed to those search engines. This is believed to generally result in a better starting point for the analysis using the referenced mapping programs. From there, the analyst can look through and manipulate the views that may be accessed through these search engines of the property as well as the neighborhood. The neighborhood and street level views may be obtained from aerial vendor partners, but map search engines tend to use surface vehicles to capture these images. Other views that may be generated by satellite imagery may also be made available via the user interface (as an alternative).

Fewer or additional images or photographs may be provided to the analyst via a graphical user interface such as that depicted in FIG. 13B, however six total graphic views is preferred because it fits well on most computer monitors and can be rendered quickly through high-speed internet connections on most commercially available computers. One advantage of the present system is that through the graphical user interface, analysts are able to meaningfully and efficiently analyze a significant number of properties every hour worked, without having to wait for screens to be rendered and without being presented with an interface having too much unnecessary information on a single screen, which can impede the efficiency of the analysis. In an implementation of the invention, project administrators, proctors, clients or other users can review and monitor the average amount of time taken by analysts to view and analyze properties, whether on a project-basis, property-basis, analyst-basis or otherwise. Depending on these statistics, the number or quality of photographs can be adjusted, or the graphical user interface provided to analysts for review may otherwise be modified.

The exemplary graphical user interface(s) illustrated in FIGS. 13A and 13B allow analysts to quickly access neighborhood and street views in the vicinity of the respective property to be analyzed, by interfacing with or manipulating the Google or Bing Maps interfaces, as would be generally known. In the upper left hand corner of FIG. 13A, basic property information is shown to be provided as a baseline for the analyst. This basic property information can be obtained from various third party providers, such as title companies and demographic data providers. The questions presented to analysts can be generic or customized for the project as previously explained, depending upon client preferences. The analyst responses to the questions can be automatically stored in the project database in substantially real time, or can be saved upon the user's instructions (e.g., by clicking on a "Save" button on the interface). As illustrated with a circle around a potential defect in the roof of the home as spotted in the upper-leftmost photo in FIG. 13B, in some implementations of the invention, an analyst may choose to highlight or select a certain area or feature of a property being analyzed. This highlighting may be accomplished using user interface techniques that are well-known to most computer users such as clicking-and-dragging on a photo to insert and then expand the depicted circle. Similar techniques for relocating and resizing an inserted highlight circle may also be made available to the analysts.

As illustrated by the exemplary interface of FIG. 13A, one potentially useful question to ask is whether the photographs or images of a property being analyzed are consistent with the property description by the real estate title company database. That is, if the property is recorded as a single family home in the title company's database, the analyst may be asked to indicate if the photographs or other images reflect that the property was described accurately. If the description does not match the property views, it may be indicative of problems with the data file. If the photographs or images do not match the description, the analyst may record the information indicating the mismatch, after which additional analysis may no longer be desired or performed (at least not until a determination of where or why the data and photographs are mismatched). The layout of the images, property information and questions in FIGS. 13A and 13B are for illustrative purposes only, and one of skill in the art would understand that the layout of these features can be relocated to any desired portion of the screen. It would also be understood that the types of questions, and the questions themselves, may vary between projects.

Figure 13D:
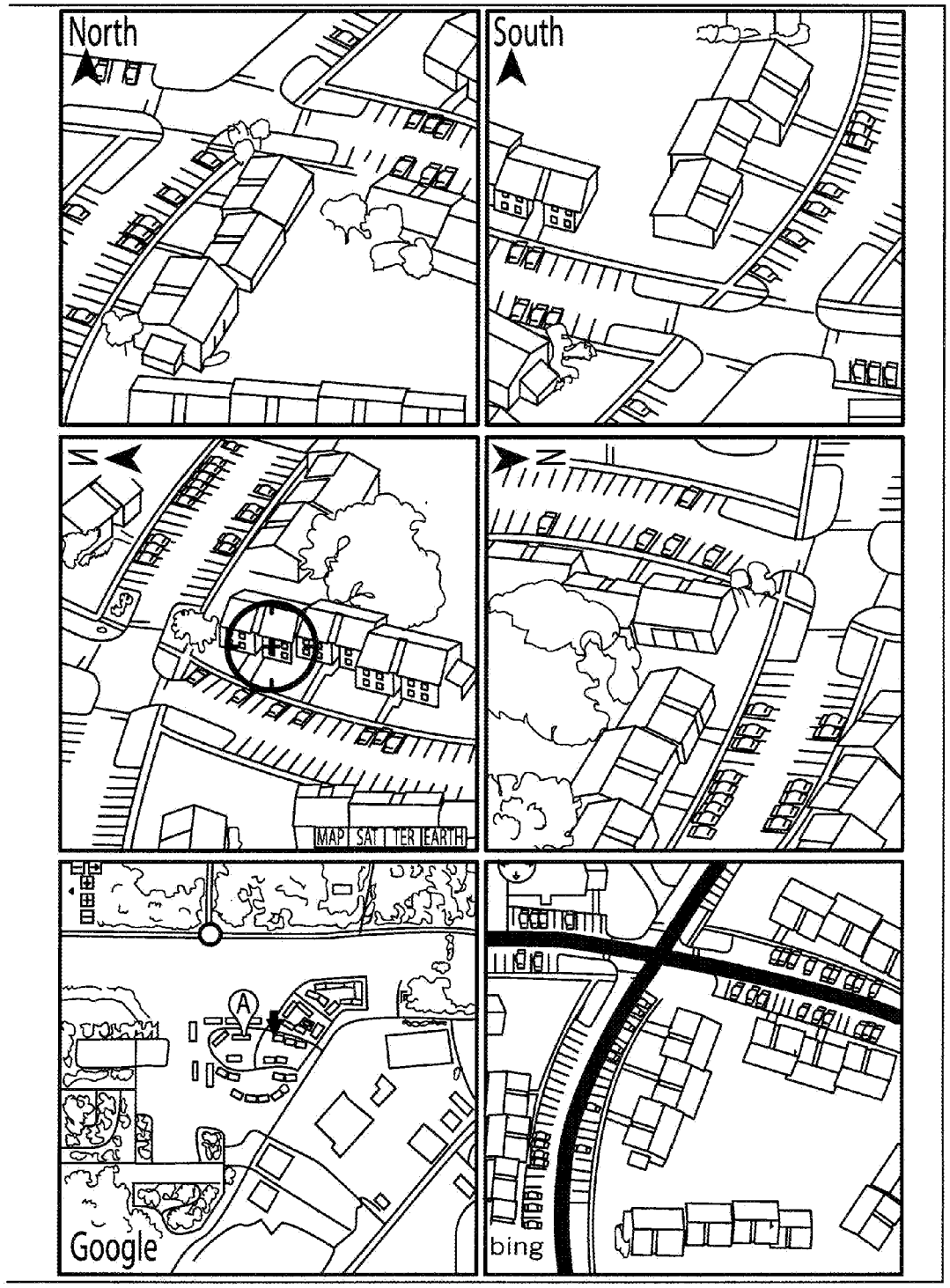

FIGS. 13C and 13D together illustrate another potential graphical user interface via which a property is provided to and analyzed by an analyst (320, 330), the property analyzed in this example (as compared to FIGS. 13A and 13B) being a commercial apartment building. These Figures illustrate a slightly different design, different set of questions, and different property views than shown in FIGS. 13A and 13B. For example, the different property types to be analyzed can be listed. FIG. 13C also illustrates the power of the multiple views provided in the photos and links to mapping programs by the inclusion of a free-text answer to the question "Retail-Anchor Store Names," upon encountering this query the analysts will attempt to manipulate and review the photos to identify the large commercial tenants such as supermarkets, discount chains, big-box retailers, etc. As will be understood by those of ordinary skill in the art, the designs and features of the graphical user interfaces described herein can vary and should not be limited to those shown in FIGS. 13A-D.

Returning to FIG. 3, the steps of flagging discrepancies 340 and reviewing an analysis by an administrator 350 will be further described in reference to FIGS. 14-17. FIGS. 14A and 14B together illustrate one potential graphical user interface for viewing results of a property analysis, and may be used to analyze a potential discrepancy between two evaluations of a particular property (in the illustrated example being that of a particular single family property). In this example, the uploaded property information and photographs are provided to two (or possibly more) analysts for analysis (e.g., Mohamad Testing and John Smith). After the two (or more) analysts analyze each property in the project, the supervisor or administrator of the project may review the results of the analysis, including the comparison of results by the two or more analysts. If the answers from the two (or more) analysts varies by a certain amount, the property is flagged for further review. For example, the client can set the acceptable standard deviation. If the analysts' answers vary more than that acceptable standard deviation, that property is also flagged for further review. In the example shown in FIGS. 14A and 14B, analysis results from the two identified analysts (Mohamad Testing and John Smith) are displayed. As shown, the administrator may decide on the status and final result based on a review and comparison of the analysts' results. Here, in this illustration, there was a discrepancy between the analysts' findings for the property grade (1 vs. 10) and the number of cars on the property (3 vs. 5). Because the standard deviation variance for the property grade has been set in this example to be a maximum of 1.5, this report was flagged for further review, and based on the administrator's further review, the property grade was overridden and given a value of 10. The illustration also shows that the administrator may further input values for all of the answers (if desired), which would have the result of overriding all of the answers of the analysts.

The proctor, the project manager, and/or the client may also randomly review the analysts' work as a quality control measure. The quality control results can also be used as material for future training, to either show what accurate analysis should look like, or what a failed, or divergent, analysis can look like.

Figure 14B:
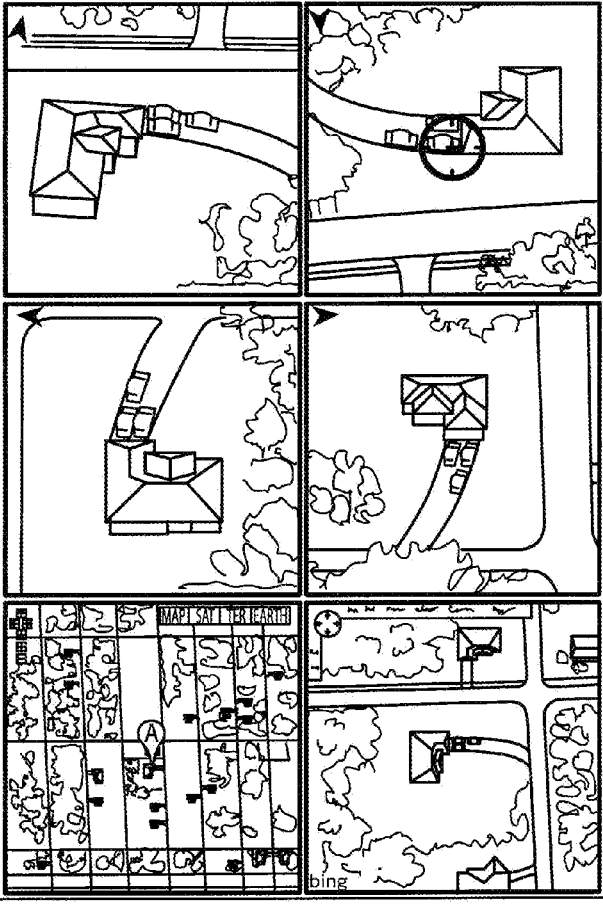
Figure 15:
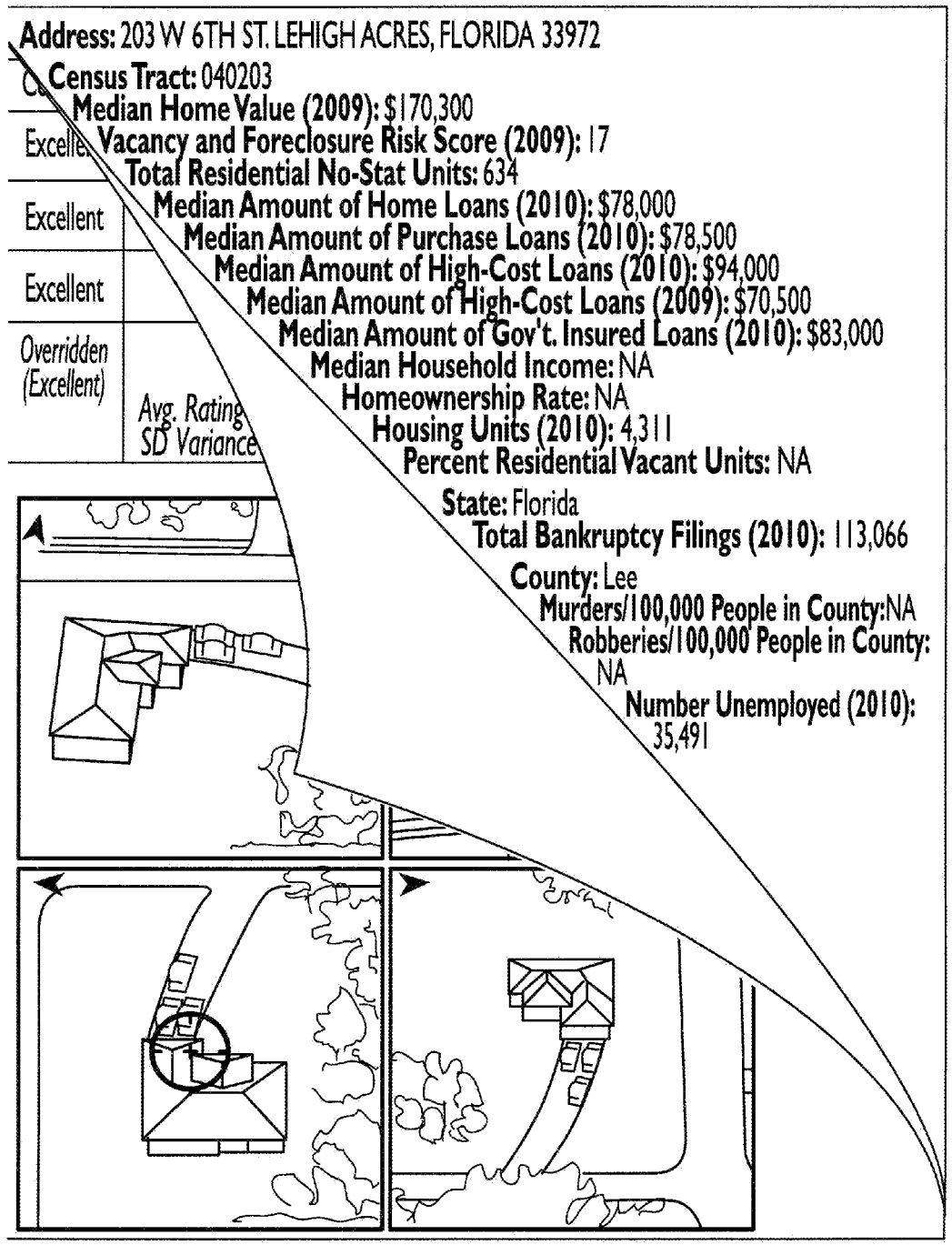
FIG. 15 illustrates one potential graphical user interface for providing additional information relating to the real estate property being analyzed in FIGS. 14A-14B.

As shown in FIG. 15, where an administrator or other user viewing the interface of FIGS. 14A-B would like additional information (e.g., demographic information relating to the neighborhood of the property in question), the user may click or select a portion of the screen to navigate to a page with additional information. For illustrative purposes only, this may be accomplished by allowing a user to select the top corner as if flipping a physical page, and the additional information may be revealed as a new graphical user interface page. Such demographic data can be available through various services such as that of PolicyMap, which allows information relating to the property holders, neighborhood trends, and other demographic information. FIG. 15 illustrates one example of an expanded portion of the PolicyMap information. The reports and all database information can be loaded onto a dedicated server and a web page containing the demographic information can be constructed. A client may wish to obtain secure access to such information for further review or analysis. In addition, notes on the properties and the portfolio can be retained for future review, and can also be forwarded to firms that presently use drive-by and/or BPO technologies. For example, information included in the database for each property (as shown by way of example in FIG. 15) can include, but is not limited to, the address of the property, the census tract information, a vacancy and foreclosure risk score, as well as information relating to the neighborhood in which the property exists, including without limitation, the number of units (residential or otherwise), the amount of home loans per year, the amount of purchase loans per year, the amount of high cost loans per year, the amount of government insured loans per year, the median household income, the home ownership rate, the number of bankruptcy filings, the number of vacant units, crime statistics for the neighborhood (murders, robberies, etc.), and the unemployment rate. It would be understood that any statistic related to that particular neighborhood can be included in the database for each property and property location.

FIG. 16 illustrates one potential graphical user interface for management of the property analysts in accordance with one implementation of the present system, and FIG. 17 illustrates one potential graphical user interface for providing an exemplary list of projects in accordance with one implementation of the present system. These graphical user interfaces show examples of how an administrator or manager may review, evaluate, track and analyze his or her projects and analysts. For example, FIG. 16 shows an example of a potential graphical user interface listing a number of analysts with contact and other information, while FIG. 17 shows an example of a potential graphical user interface listing a number of existing projects. Each of these interfaces may be used by administrators or managers in connection with their administrative review of the projects and analyses (step 350 of FIG. 3).

Figure 18:
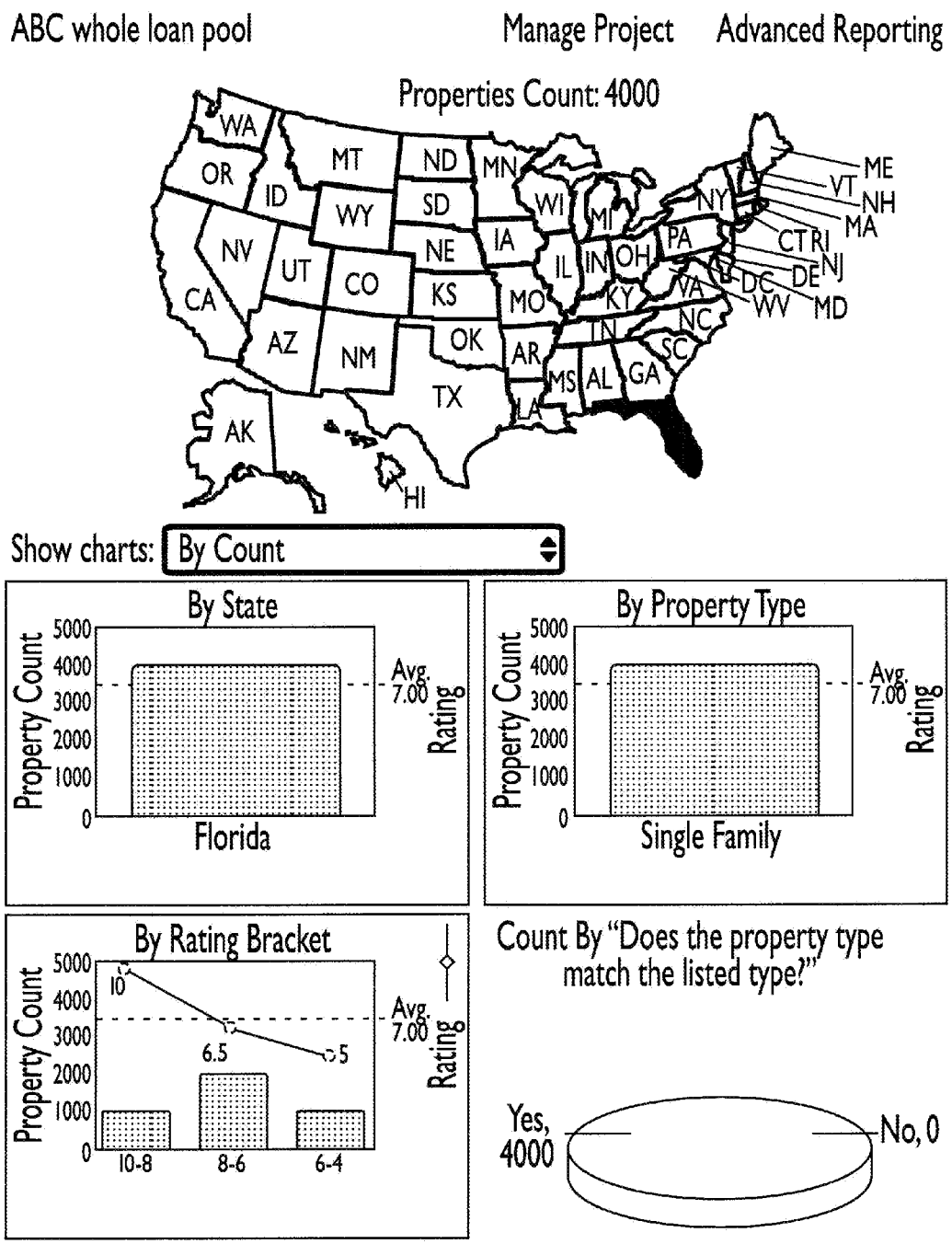
FIG. 18 illustrates a potential graphical user interface for reporting and analyzing information relating to an exemplary real estate property project.
Figure 20:
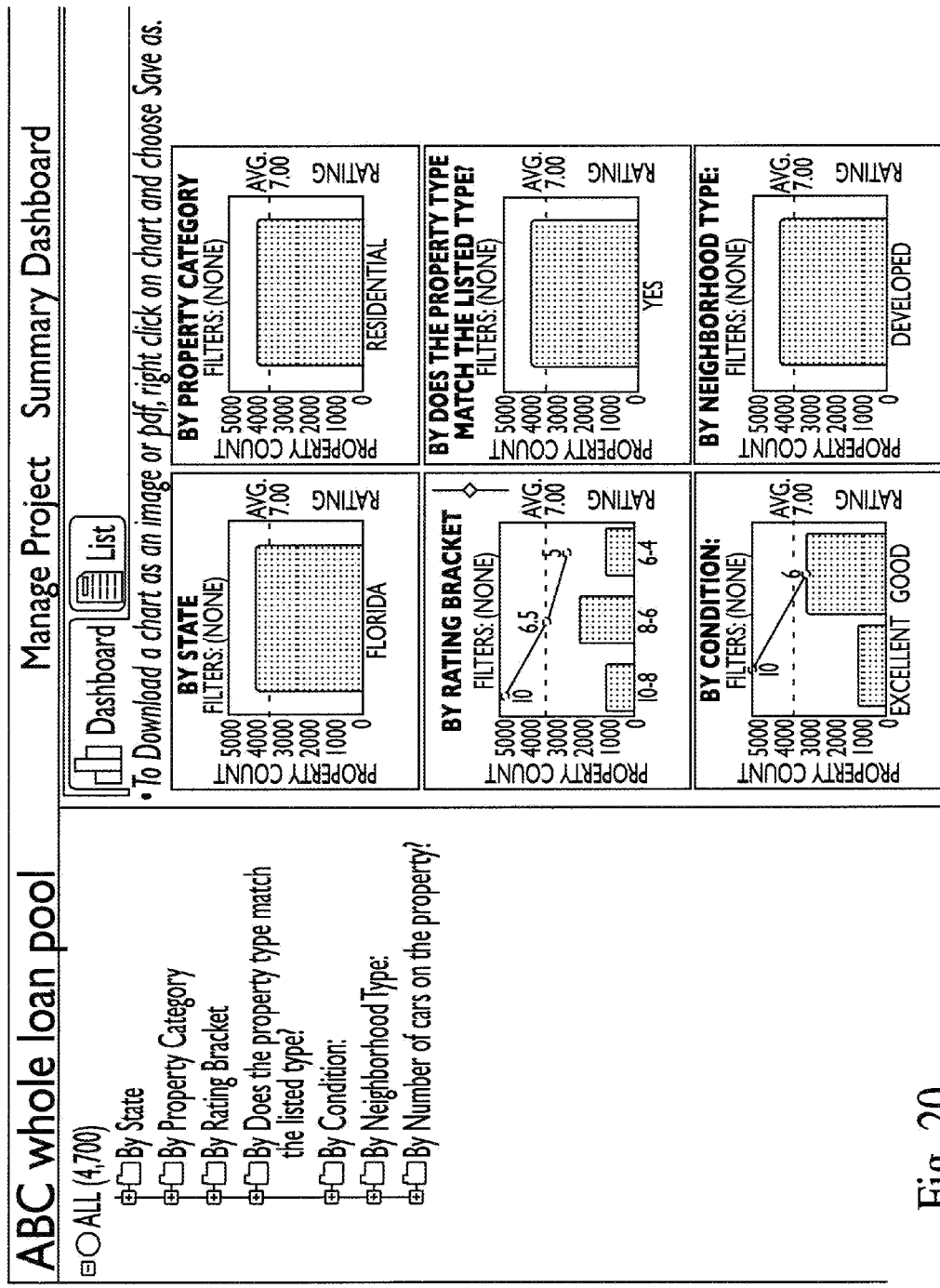
FIG. 20 illustrates one potential project summary of an exemplary real estate property project in accordance with one implementation of the present system.

In some implementations of the invention, after an analysis is conducted (step 140 of FIG. 1), one or more reports summarizing the analysis are generated and issued (step 160 of FIG. 1). Such reports may designed or created show any desired information, including the property results and neighborhood trending. These reports may be created for any number of reasons, including to assist the client in assessing the actions to be taken for each property, or to provide internal reporting information for the administrators of the projects to assess backlog, personnel bandwidth, or analyst performance. FIGS. 18-20 illustrate potential representative reports that may be generated and issued to a client on a project. These reports may be passive written reports or, preferably, interactively provided via a graphical user interface. FIGS. 18-20 illustrate example reports relating to all assets analyzed in a given project (i.e. the illustrative ABC Whole Loan Pool). These reports can be created based on the project data generated by the analysts, data from third party vendors (e.g., PolicyMap), and information provided by the client. Property data for a given project may be aggregated to show overall results (e.g., average rating by state, average rating by property type, average rating by rating bracket, percent of properties that match the listed type), and may be presented in a variety of ways (e.g., bar graphs, pie charts, line graphs) to convey overall results of the property visualizations. FIG. 19 illustrates an example of a potential project dashboard report that shows a list of properties for a particular project, which list may be filtered to obtain a sublist of certain results. By selecting the "Dashboard" tab on the top, graphical representations of aggregated data for the project may be displayed as shown by way of example in FIG. 20 (e.g., property counts and grade averages by state, property category, rating bracket, property match to listing, condition, and neighborhood type). The graphics can be interactive allowing the client to drill down behind the numbers. In addition, summary reports are available, and the properties can be sorted according to the visualization rating by type of property (e.g., residential or commercial) and/or location of the property. Reports can be prepared in-house or by third-party report generation software, such as the software provided by Fusion Charts (India). One of skill in the art would understand that some or all of these features and/or variables can be presented or omitted in the reports. In addition, other features and/or variables can be listed, including, but not limited to, property size, habitation, etc.

Figure 21:
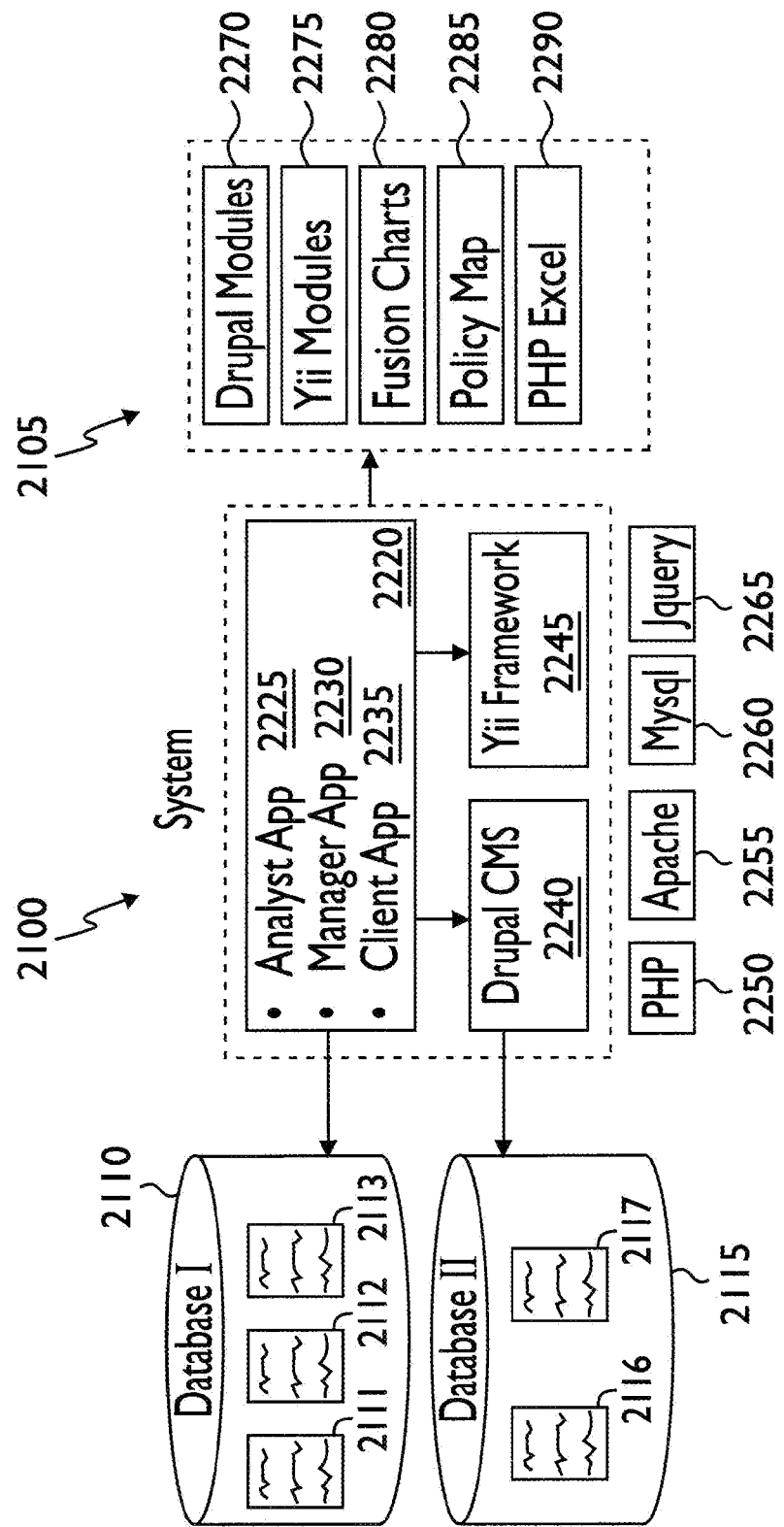
FIG. 21 illustrates an exemplary block diagram of a system associated with one implementation of the invention.

FIG. 21 is an exemplary block diagram of one potential system level implementation of the invention. In one aspect, the system 2100 can comprise a first database 2110 and a second database 2115. It would be understood by one of skill in the art that the number of databases employed in the system can vary depending upon, among other variables, the size of the system. The databases 2110, 2115 are used to store information relating to projects 2111, properties 2112, reports 2113, clients 2116, and analysts 2117. The databases 2110, 2115 are operably connected with the system 2100. It would be understood that the databases 2110, 2115 can be combined into a single database or expanded into a greater number of databases, depending upon the amount of data to be stored. Further, the databases 2110, 2115 can be used to store any additional data or information required for any visualization project.

The system 2100 may comprise a series of stored apps 2220. These apps include, but are not limited to, an analyst app 2225, a manager app 2230, and a client app 2235. The system can also include a Drupal content management system (CMS) 2240 and a Yii framework 2245. It would be understood that the content management system can be any content management system that allows for website authoring, collaboration, and administration of the website. Further, the framework can be selected from any software framework that is a reusable set of libraries for a software system or subsystem, which can be used to implement the structure of applications for an operating system or for development of dynamic websites or applications. The exemplary system 2100 can be based on a combination of the CMS and the framework to form a virtual single platform for the visualization of real estate properties. The system bootstraps the CMS 2240 and the framework 2245 and utilizes both to serve a web request or execute a process. The CMS 2240 can be used for generic functionalities such as, but not limited to, content, security, users, roles, navigation, themes, menus, and notifications. The framework 2245 is used for business logic, and entities such as, but not limited to analysts, projects, clients, questions, dashboards, and reporting.

The exemplary system 2100 can further include a set of programs and databases that allow for a variety of web functions. The PHP (hypertext preprocessor) 2250 may be used to provide for use of a server-side scripting language. Apache 2255 may be used to provide web server software. Mysql 2260 may be used to provide for relational database management. Jquery 2265 is a cross-browser JavaScript library for simplifying client-side scripting of HTML. It would be understood that other programs serving the same purposes can be substituted for those discussed above.

The exemplary system 2100 can also be operably connected with a third-party site 2105. The third-party site contains one or more Drupal modules 2270, one or more Yii modules 2275, fusion charts (or other reports generated by similar software) 2280, policy maps 2285, and PHP excel 2290.

Figure 22A:
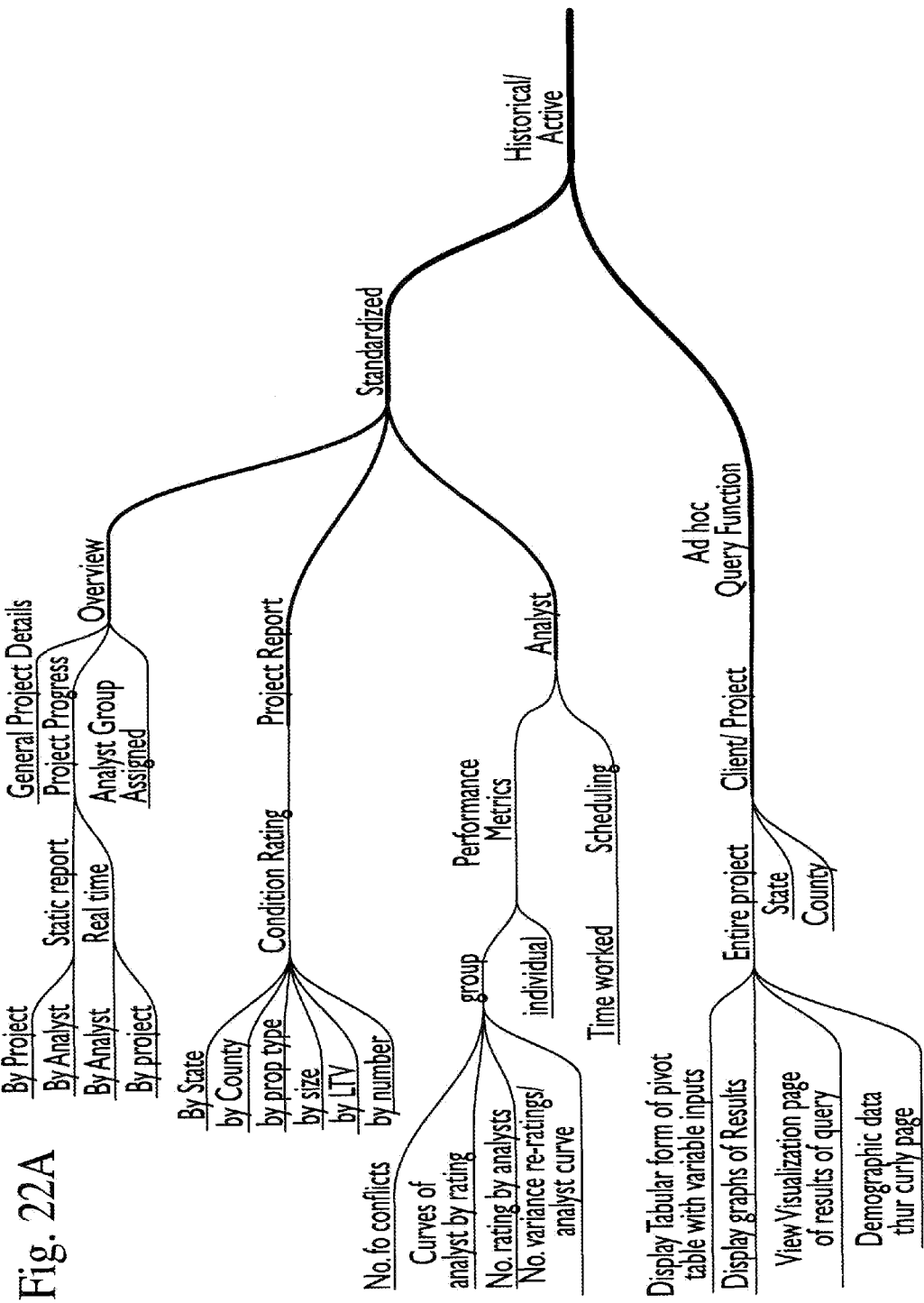
FIGS. 22A-22D together illustrate a mind map showing one exemplary implementation for a system and method for mass visualization of real estate properties.
Figure 22B:
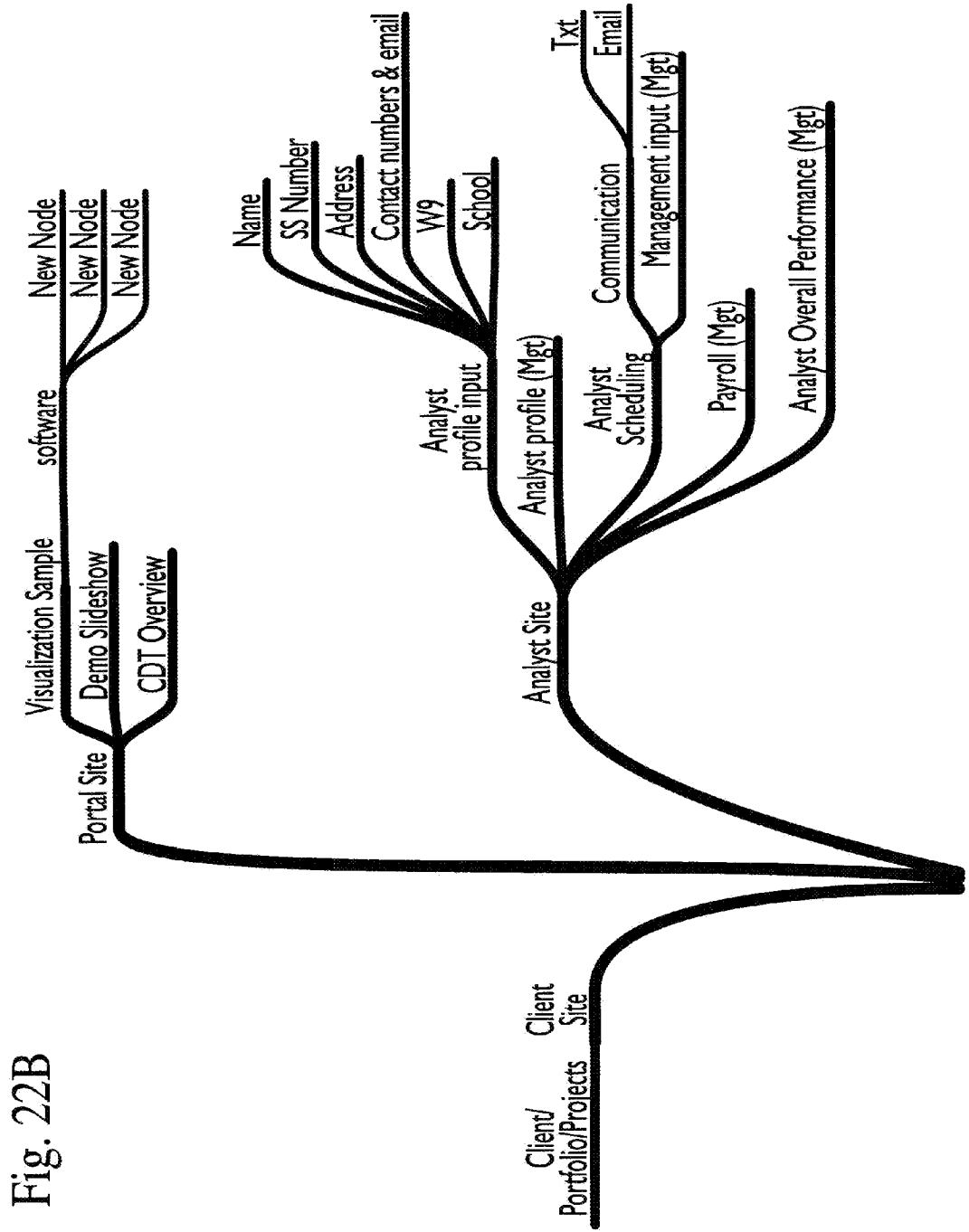
Figure 22C:
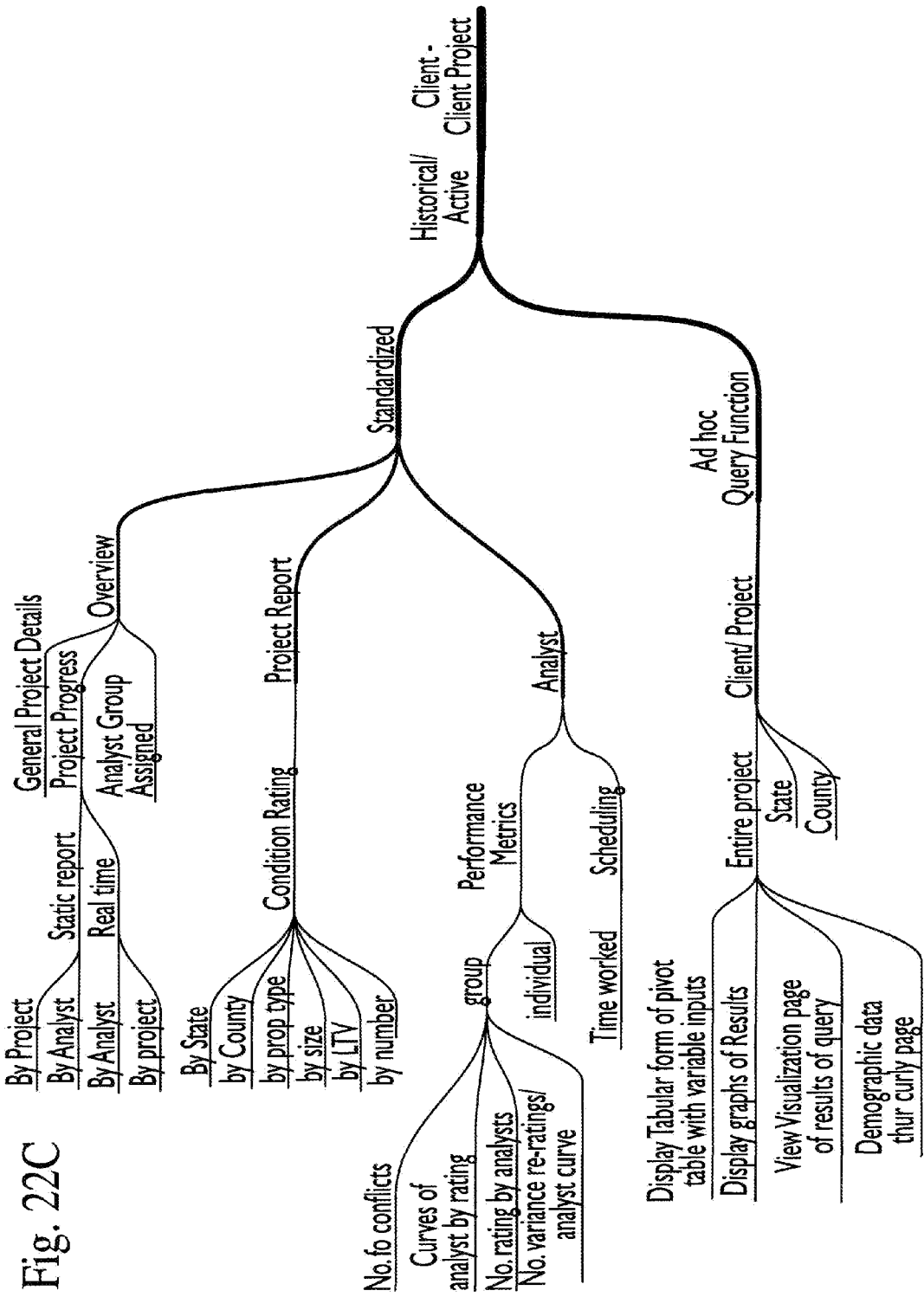
Figure 22D:
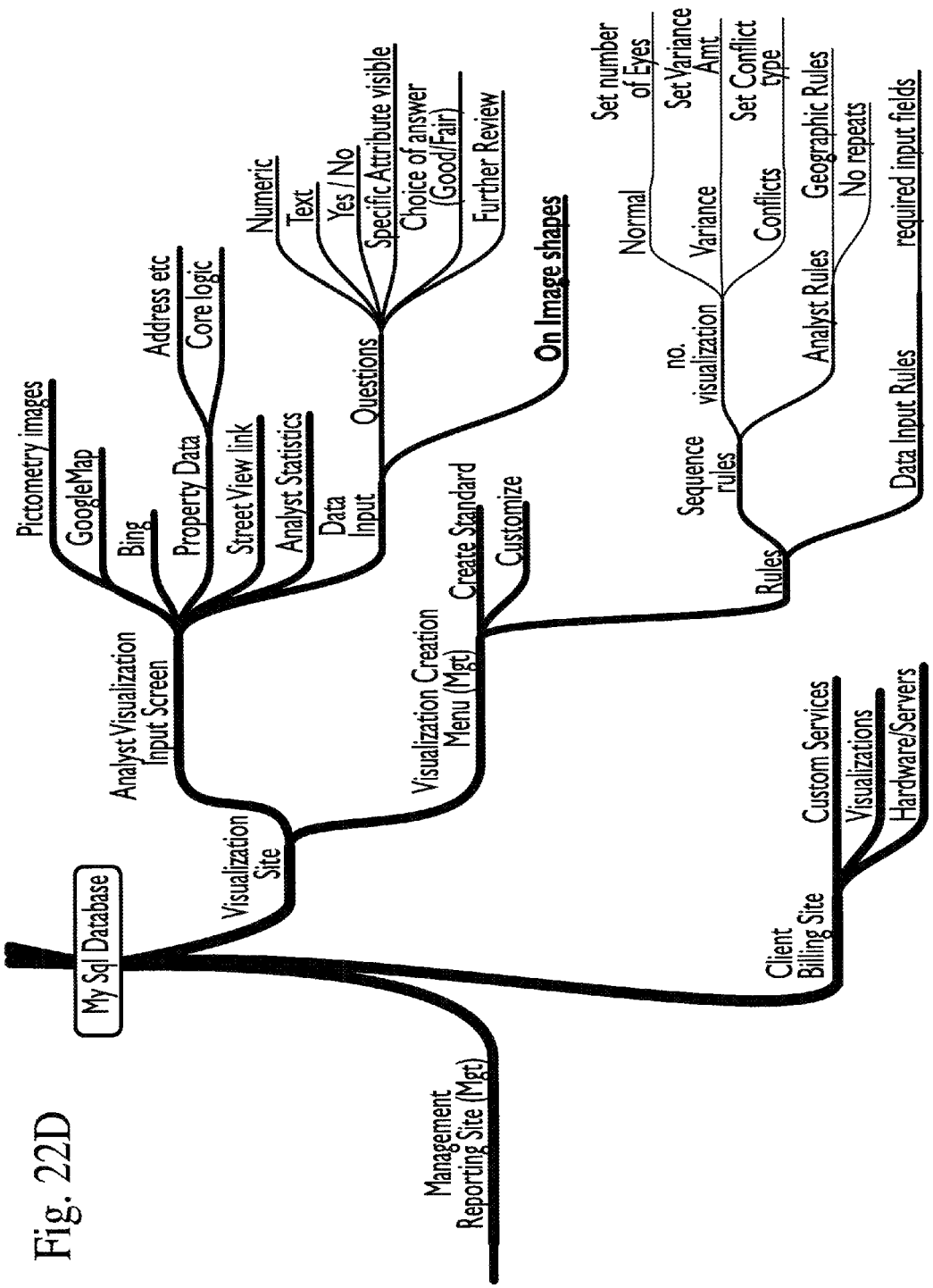

FIGS. 22A-22D together illustrate one potential mind map of the system behind the present invention, showing the interrelations between the different branches of the system. FIG. 22A represents both past and present projects stored in a SQL database on a client site portion of the database. FIG. 22B represents the client site portion that comprises a portal site and an analyst site. FIG. 22C illustrates the management reporting branch relating to past and present projects stored in the SQL database. FIG. 22D represents the visualization site and the client billing site for the system. Together these various aspects of the concept behind the present systems and methods disclosed in the present application may be use, reused, combined and recombined to provide functionality connections between available data, functionality, and the like.

Example

In one implementation, a system in accordance with the invention can be used in a partnership with a university. In this example, ABC University has been selected to test the inventive system of visualizing a large number of real estate properties. ABC University has an on-campus computer facility with internet access to serve as the facility for real estate property analysis. For ABC University, there are several benefits available. For example, (a) the students gain real-world experience; (b) the system and method provide training and work experience for the students; (c) the students get a head start in the real estate focus of the Business School; (d) an increase in corporate sponsorship; and (e) the business school itself will gain an edge and become a leader in housing and healthcare issues and solutions therefore. In addition, the students analytical skills increase, they gain an insider's view of risk assessment, they receive payment for their services, they have a potential leg-up on employment opportunities, and, in general, increase their marketability and improve their resumes.

As stated above, the exemplary system and method of the invention represent a unique opportunity for the government to analyze housing issues and perhaps even spot trends in the housing market. In the financial sector, government agencies including the Federal Housing Finance Agency (FHFA), Freddie Mac, Ginnie Mae, Fannie Mae, would benefit from the analyses of properties according to the invention. The Department of Health and Human Services, in the form of Medicare, Medicaid, and SCHIPS, would also benefit from this analysis using ABC University facilities, students, and faculty.

Students enrolled in ABC University's Masters programs in Business Administration, as well as seniors in the undergraduate Business department are interviewed for participation in the program. In addition, ABC University professors are available to assist in the selection of analyst candidates, teaching the relevant diligence course, and to provide in-room proctoring of the work during the course of the project. Both the students and the professors receive a stipend for their participation.

During the course of the project, ABC University students are able to visualize and assess at least between about 700 to about 900 properties per day. As discussed above, each property is viewed by at least two analysts. If there is significant variation between the two analyses, an administrator can review, or additional student reviews are authorized. After review and analysis of the properties, a variety of reports are generated, which assist the client, be it an individual, a private company, or a government agency, in determining a course of action for each property or each set of properties within a project.

While various embodiments of the present invention have been described above, it should be understood that such disclosures have been presented by way of example only, and are not limiting. Thus, the breadth and scope of the present invention should not be limited by any of the above-described exemplary embodiments, but should be defined only in accordance with the following claims and their equivalents. While the specification is described in relation to certain implementations or embodiments, many details are set forth for the purpose of illustration. Thus, the foregoing merely illustrates the principles of the invention, and the invention is not limited thereto. For example, the invention may have other specific forms without departing from its spirit or essential characteristic. The described arrangements are illustrative and not restrictive. To those skilled in the art, it will be clear that the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

The invention claimed is:

1. A computerized method of assessing real estate properties comprising:
   a. receiving, via an input of a computing device configured to be executed by a processor, a list of real estate properties;
   b. obtaining, via the input of the computing device configured to be executed by the processor, the addresses or assessor parcel numbers for the real estate properties in the list of real estate properties;
   c. obtaining, via the input of the computing device configured to be executed by the processor, geocodes for the real estate properties in the list based on the addresses or assessor parcel numbers;

19 d. obtaining, via the input of the computing device configured to be executed by the processor, at least two images of each of the real estate properties;
e. providing, via an output of the computing device configured to be executed by the processor, the list of real estate properties, the addresses or assessor parcel numbers of the real estate properties, the geocodes for the real estate properties, an analysis comparison result, and the images of the real estate properties into a database coupled to the processor;
f. providing, by the processor, access to the database via a graphical user interface;
g. displaying, by the output, all of the images of a selected one of the real estate properties via the graphical user interface;
h. accepting, by the processor, a first set of ratings for the list of real estate properties input via the graphical user interface in response to the ratings received from a first analyst;
i. accepting, by the processor, a second set of ratings for the list of real estate properties input via the graphical user interface in response to the ratings received from a second analyst, said first analyst being different from the second analyst;
j. providing, by the processor, the analysis comparison result of comparing the first set of ratings to the second set of ratings; and
k. providing, by the processor, an alert for further review in response to the provided analysis comparison result having an inconsistent result.

2. The computerized method of claim 1, further comprising generating, by the processor, a list of questions relating to the condition or status of the real estate properties.

3. The computerized method of claim 2, further comprising generating a report including property rating data.

4. The computerized method of claim 3, further comprising providing an interface to facilitate administrator review of the property rating data obtained from the at least two analysts.

5. The computerized method of claim 3, further comprising additional review of properties if the at least two analysts ratings fall outside a predetermined range.

6. A computer system comprising:
 a user interface operating on a plurality of computers, the user interface displaying information contained in a centralized database, the user interface further facilitating the storage of data in the database;
 the database being stored in memory, such that it may be operably accessed by each of the plurality of computers, the database comprising:
  a. a list of real estate properties;
  b. the addresses and/or assessor parcel numbers of the real estate properties;
  c. geocodes for each of the real estate properties in the list of real estate properties;
  d. at least two images of each of the real estate properties in the list of real estate properties; and
  e. a list of questions customizable by a requester of an analysis of the list of real properties relating to the condition or status of the real estate properties;
 and
 a plurality of processors corresponding to the plurality of computers, said plurality of processors configured to execute computer-executable instructions directed to one or more of the following:
  a. accepting at least two ratings for each of the list of real estate properties via the user interface from at least two different analysts;

20 b. providing the analysis comparison result of comparing the at least two ratings; and
  c. providing an alert for further review in response to the provided analysis comparison result having inconsistent results from the first set of ratings and the second set of ratings over a significant discrepancy threshold.

7. The computer system of claim 6, wherein the database further includes stored ratings data for each of the real estate properties.

8. The computer system of claim 7, further comprising a report generator operably connected to the memory for gathering data from the database so as to generate reports based on the ratings data of the real estate properties.

9. The computer system of claim 6, wherein the database is a relational database.

10. A computerized method of analyzing a group of real estate properties comprising:
a. providing a first analyst access, via a graphical user interface on a computer, to data in a database, said data in the database including a list of real estate properties, addresses and/or assessor parcel numbers of the real estate properties, geocodes for the real estate properties, at least two images of the real estate properties, and a list of questions relating to the condition or status of the real estate properties;
b. providing a second analyst access, via a graphical user interface on a computer, to the data in the_database;
c. storing in a database answers of the first analyst to each question in the list of questions relating to the condition or status of the real estate properties;
d. storing in the database, answers of the second analyst to the same questions as presented to the first analyst relating to the condition or status of the real estate properties;
e. comparing the answers of the first analyst to the answers of the second analyst; and
f. flagging any inconsistent results in the database for further review.

11. The computerized method of claim 10, further comprising generating a report based upon data obtained from the first and second analysts' review of the real estate properties.

12. The computerized method of claim 10, further comprising generating the list of questions relating to the condition or status of the real estate properties.

13. A computerized system comprising:
a. at least one processor;
b. a first database for storing property information and project information operably linked to a core logic, said property information including a set of real estate properties, addresses and/or assessor parcel numbers of the real estate properties, geocodes for the real estate properties, at least two images of the real estate properties, and a list of questions relating to the condition or status of the real estate properties;
c. a second database for storing client and analyst information;
d. an application for allowing at least two analysts to review the property information and to answer the same list of questions relating to the condition or status of the real estate properties;
e. an application for comparing the answers of the analysts and flagging any inconsistent answers for further review;
f. an application for allowing a project manager to review the analysts results in response to the flagged inconsistent answers to the list of questions by the at least two analysts;

g. an application for allowing manipulation of the client information and generation of the list of questions relating to the set of real estate properties;
h. a content management system; and
i. a software framework.

14. The computerized system of claim 13, further comprising a hypertext preprocessor.

15. The computerized system of claim 14, further comprising web server software.

16. The computerized system of claim 15, further comprising software for relational database management.

17. The computerized system of claim 16, further comprising a cross-browser for client-side scripting of hypertext mark-up language (HTML).

* * * * *